United States Patent [19]
Wang

[11] Patent Number: 6,007,667
[45] Date of Patent: Dec. 28, 1999

[54] INTERLOCKING METHOD FOR MANUFACTURING THE INFLATION PRODUCTS

[75] Inventor: Kenneth Wang, Taipei, Taiwan

[73] Assignee: Team Worldwide Corp., Taipei, Taiwan

[21] Appl. No.: 08/788,955

[22] Filed: Jan. 24, 1997

[51] Int. Cl.[6] .................................................. B32B 31/00
[52] U.S. Cl. ........................................... 156/292; 156/264
[58] Field of Search ................................. 156/292, 147, 156/145, 264

[56] References Cited

U.S. PATENT DOCUMENTS

| | | | |
|---|---|---|---|
| 1,603,465 | 10/1926 | Hopkinson | 156/292 |
| 4,028,042 | 6/1977 | Goodfellow et al. | 425/515 |
| 4,900,385 | 2/1990 | Ochi et al. | 156/292 X |
| 4,931,115 | 6/1990 | Rajunen | 156/292 X |
| 4,931,121 | 6/1990 | Raspor et al. | 156/292 X |
| 4,950,354 | 8/1990 | Schirmer | 156/292 X |
| 5,304,271 | 4/1994 | Gusakov | 156/145 |

*Primary Examiner*—Francis J. Lorin
*Attorney, Agent, or Firm*—Michael D. Bednarek; Crowell & Moring LLP

[57] ABSTRACT

By means of the interlocking methods skillful applying on the combination of the blanks, the supporting structures of the inflation products are easily constructed by these complementary blanks, and the same features of these products can be achieved by the economical usage of the sheet bars. Also, the strength of these products can be increased by the multiple supporting area of the interlocked blanks. This interlocking methods can be not only satisfied the all purposes of the inflation products but also met the standards of the environmental requirements because of its less scraps.

16 Claims, 32 Drawing Sheets

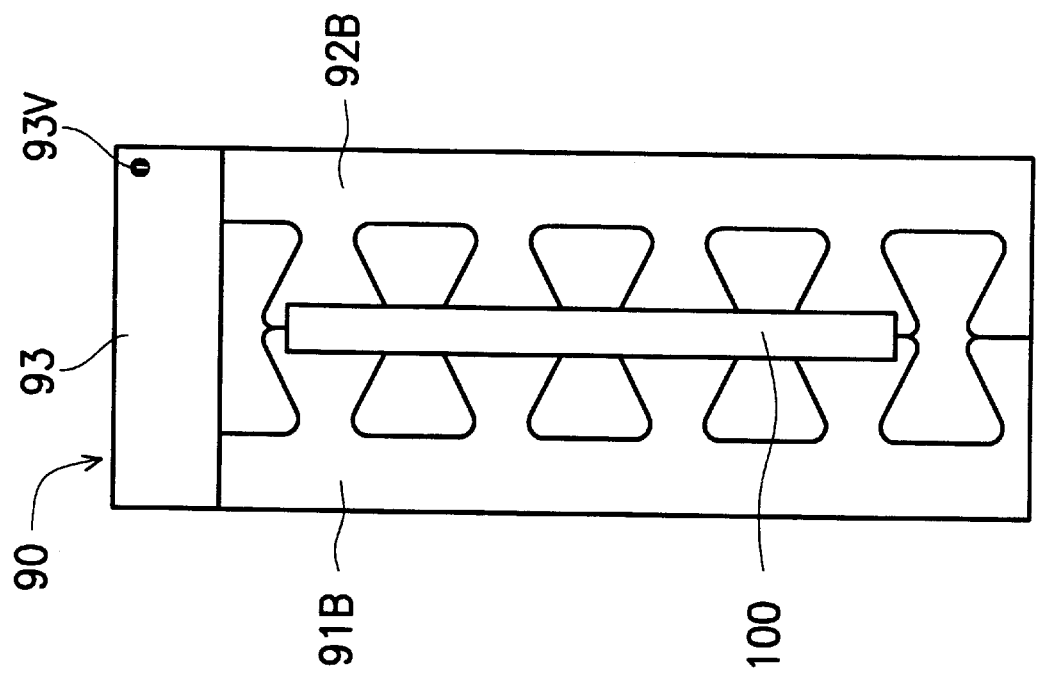
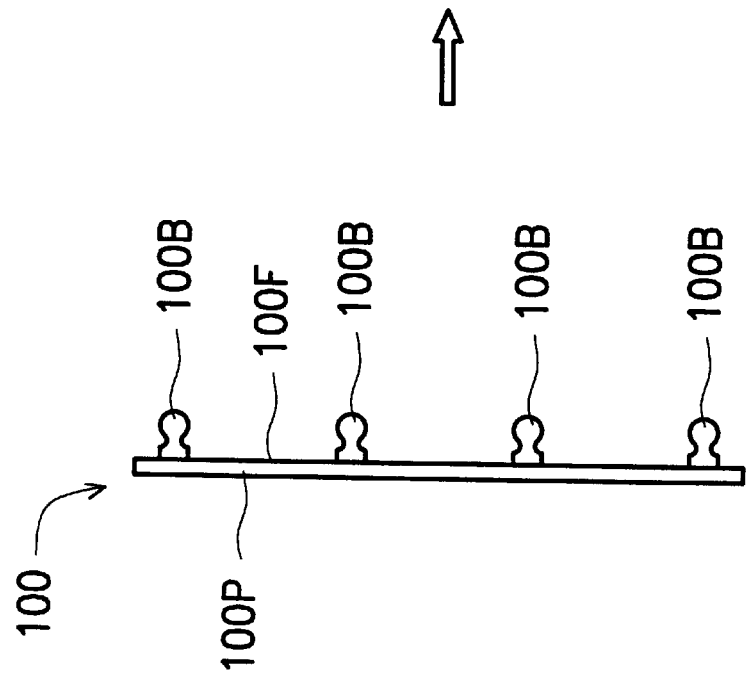
FIG. 5J

INTERLOCKING METHOD FOR MANUFACTURING THE INFLATION PRODUCTS

BACKGROUND OF THE INVENTION

1. Field of the Invention

The present invention generally relates to an interlocking method for manufacturing the inflation products. More particularly, the present invention relates to the sheet bars which are punched into a plurality of pairs of complementary blanks, wherein a single blank or both the complementary blanks from the sheet bar can be allocated in a sophisticated arrangement with a joint member so as to form the supporting structure of inflation products, and therefore the scrap can be eliminated.

2. Description of the Related Art

In the present inflation products, such as the air mattresses, the family-pool, and the self-inflating air-bed, etc., the flexible plastics are the principle sheet bar for composing the structure of these products. Basically, the structure of any inflation products comprises at least two pieces of plastic sheets jointed together and the closed space is formed therebetween. Then, the inflation product can be worked as long as the adequate air is injected into the space between two pieces of the sheets. The following will separately describe the conventional structures of these inflation products: the air mattresses, the family-pool, and the air-bed, and make a comparison between the same products with the interlocking inflation products according to the present invention.

The family-pool, as shown in FIG. 1A and FIG. 1B, is in comparison to the interlocking pool shown in FIG. 1C and FIG. 1D;

The first conventional air bed, as shown in FIG. 2A and FIG. 2B, is in comparison to the interlocking air bed shown in FIG. 2C to FIG. 2E;

The second conventional air bed, as shown in FIG. 3A to FIG. 3C, is in comparison to the interlocking air bed with the annular tension belts shown in FIG. 3D to FIG. 3F;

The third conventional air bed, as shown in FIG. 4A, is in comparison to the interlocking air bed with the arrangement of the interlocking tension belts shown in FIG. 4B to FIG. 4G;

The air mattress, as shown in FIG. 5A, is in comparison to two kinds of interlocking mattresses air shown in FIG. 5B to FIG. 5J.

SUMMARY OF THE INVENTION

It is accordingly an object of the present invention to provide an interlocking method for forming the supporting structure of the inflation products with the economical usage of the material.

It is a further purpose of this invention to provide an interlocking method which eliminate the amount of the scraps while pressing.

Yet another purpose of this invention is to provide an interlocking method to forming the annular tension belts as the supporting structure of the air bed for increasing the supporting area.

Another purpose of this invention is to provide an interlocking method to forming the plate-type tension belts as the supporting structure of the air bed for reducing the usage of the material.

Another purpose of this invention is to provide an interlocking method to forming a cushion as the supporting structure of the air bed for diminishing the scraps.

Another purpose of this invention is to provide an interlocking method to forming the chambers of the air mattress for increasing the supporting area and eliminating the waste.

To attain the above object, the present invention provides an interlocking method for manufacturing the inflation products, comprises the following two categories.

The steps of the first category are:

pressing at least one piece of sheet bar into a plurality of blanks which has several pairs of the complementary blanks therein, wherein each blank of the pairs of complementary blanks is composed of an obverse blank and a reverse blank which are simulanteously formed with at least one concavo-convex side thereon, and the concavo-convex side has a shape with a plurality of concavities and convexities; and using at least one joint member connected to the concavo-convex sides of the obverse blank and/or the reverse blank separately as the supporting structure of the inflation products by means of the interlocking method.

The steps of the Second category are:

pressing at least two pieces of sheet bars into a plurality of blanks which have several pairs of the complementary blanks therein, wherein each blank of said pairs of complementary blanks is composed of an obverse blank and a reverse blank which are simulanteously formed with at least one concavo-convex side thereon, and said concavo-convex side has a shape with a plurality of concavities and convexities; and sealing two said blanks together and forming a closed space therebetween.

The aforementioned interlocking method can apply on the structure of the inflation productions such as the air bed, air mattresses and the pools.

BRIEF DESCRIPTION OF THE DRAWINGS

Other objects, features and advantages of the present invention will become apparent by way of the following detailed description of the preferred but non-limiting embodiment. The description is made with reference to the accompanying drawings, wherein:

FIG. 5I is a plan view showing the combination of the first and second chamber; and FIG. 5J is a plan view showing a reinforcement jointed to the air mattress.

DESCRIPTION OF THE PREFERRED EMBODIMENTS

Hereinafter, the preferred embodiments according to the present invention will be described in detail.

EMBODIMENT 1

Figure 1A:
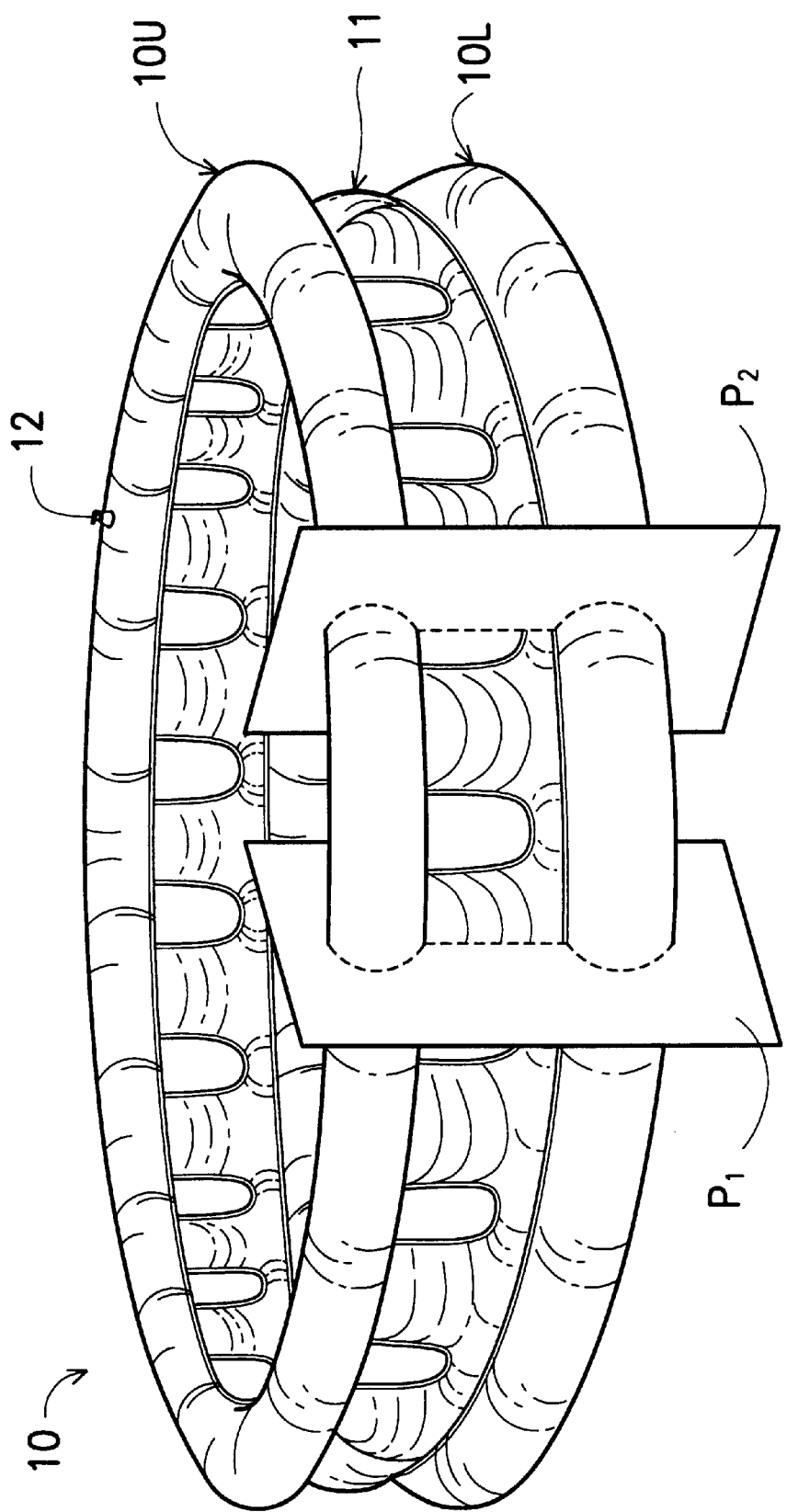
FIG. 1A is a perspective view showing the outline structure of the conventional inflated pool.
Figure 1B:
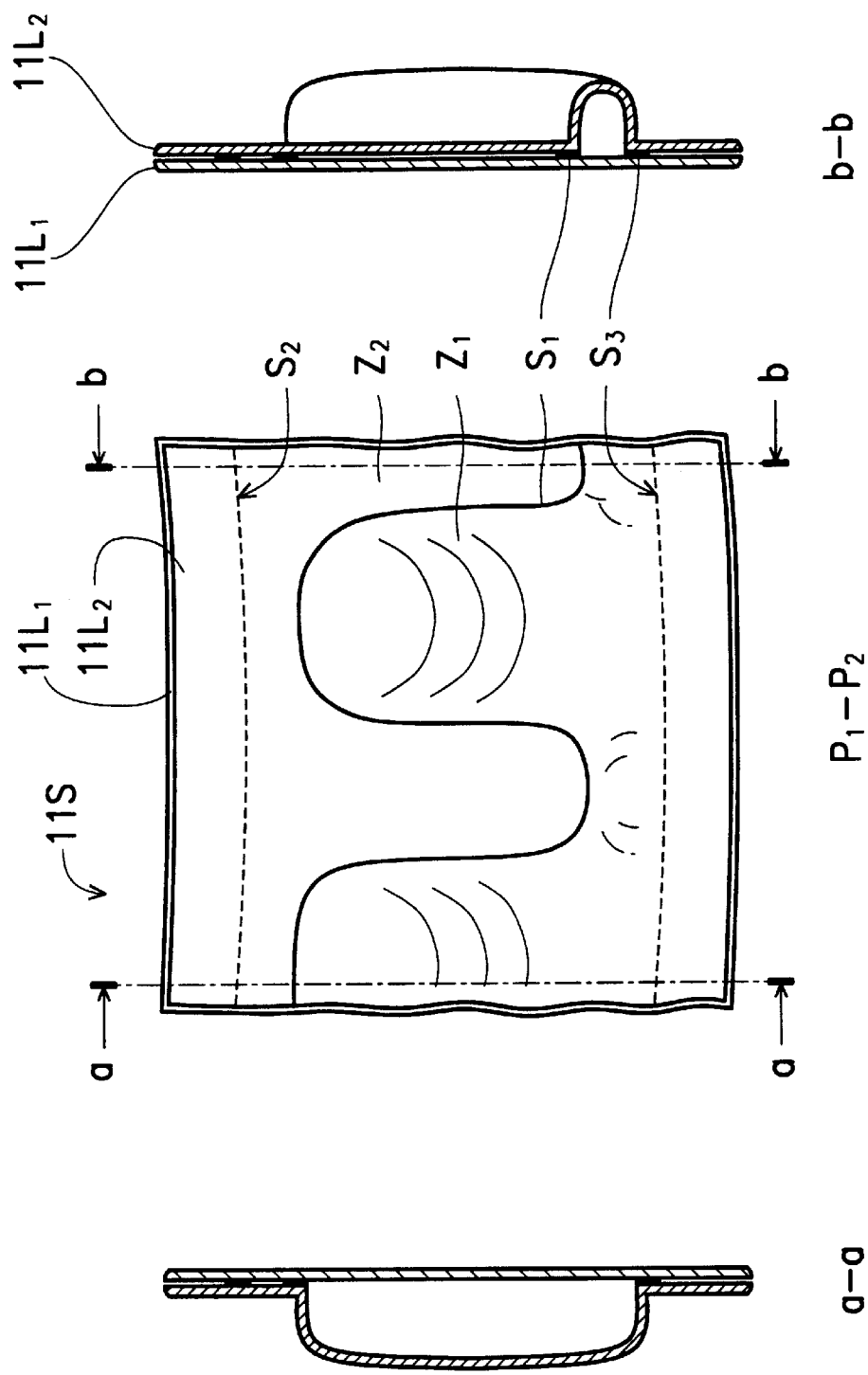
FIG. 1B is a sectional views showing the local structure of the wall from plane $P_1$ to plane $P_2$ according to the inflated pool in FIG. 1A.

Referring to the FIG. 1A and FIG. 1B, there is a perspective view showing the structure of the conventional inflated pool 10, and FIG. 1B represents the partly sectional views showing the local structure of the wall 11 from plane $P_1$ to $P_2$ according to the inflated pool 10 in FIG. 1A. The pool 10 is composed of an upper chamber 10U, a lower chamber 10L and a wall 11. The wall 11 is connected between the upper and lower chamber 10U and 10L, and these three portions are inflated orderly through the valve 12 installed on the upper chamber 10U. The portion 11S of the wall 11 sectioned from plan $P_1$ to $P_2$ omitted the upper is chamber 10U and the lower chamber 10L is formed with a lamination. In general, the portion 11S (i.e. the wall 11) comprises an inner lamina $11L_1$ and outer lamina $11L_2$ coupled together by sealing along the line $S_1$, $S_2$, and $S_3$, and therefore the inflated zone $Z_1$ and the non-inflated zone $Z_2$ are formed. Besides, the laminated structure of the portion 11S can be clearly observed from the Section a—a and b—b. The inflated zone $Z_1$ sealed within the line $S_1$ and $S_3$ is swelled by pumping the air therein and then the pool 10 is situated on a inflated condition. However, the non-inflated zone $Z_2$ sealed within the line $S_1$ and $S_2$ is formed with two laminas. The non-inflated zone $Z_2$, therefore, can be simplified in one sheet of lamina.

The above problem can be effectively and easily solved by blanking the sheet bar with the interlocking method according to the present invention. This sophisticated method is suitable for all the inflated products or even the same procedure of other products.

Figure 1C:
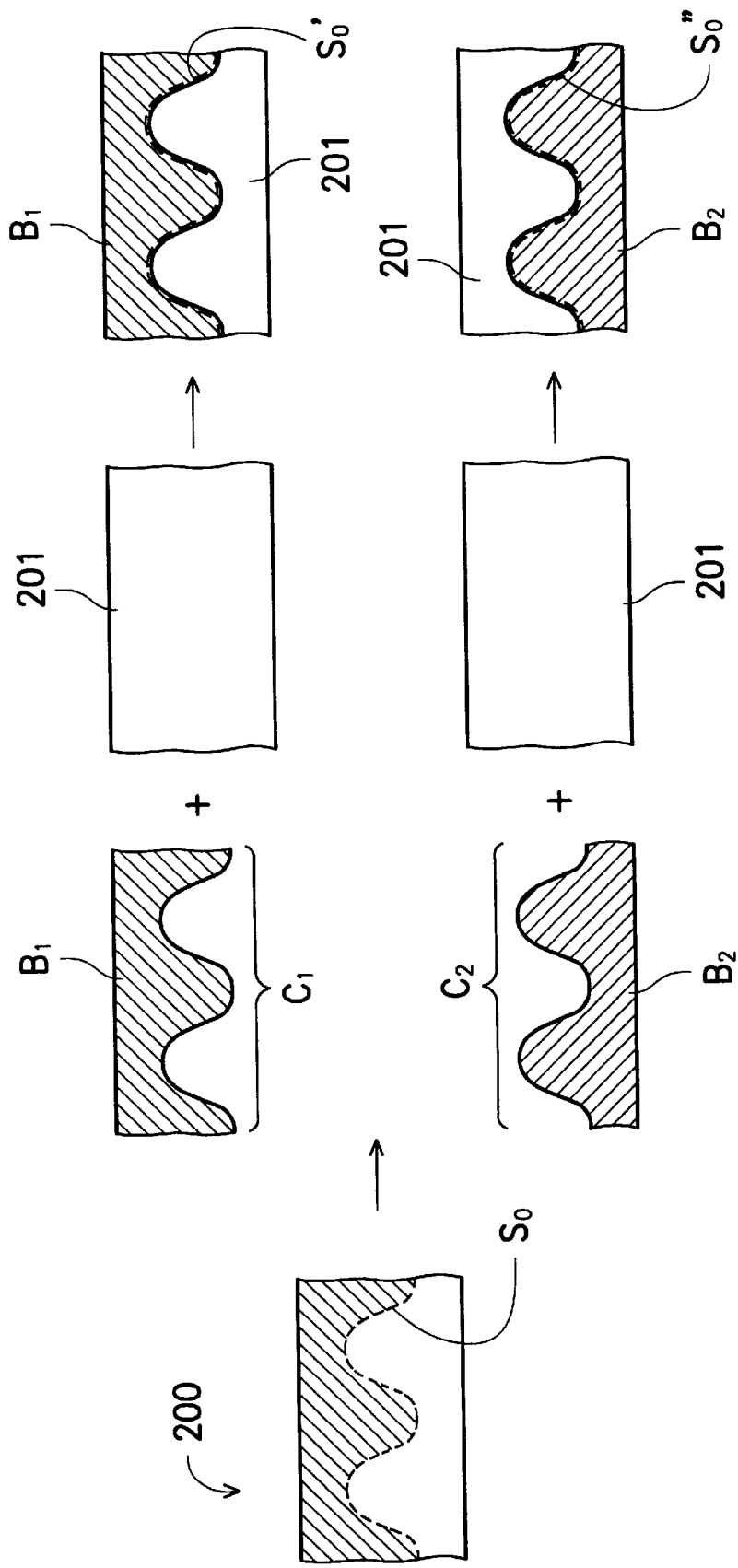
FIG. 1C is a schematic flow chart showing the process of producing the blanks being as the wall of the pool according to the first embodiment of interlocking method of the present invention.

Referring to FIG. 1C, this flow chart schematically represents the process of producing the blanks $B_1$ and $B_2$ from the sheet bar 200. A sheet bar 200 is divided into two blanks $B_1$ and $B_2$ by pressing along the dotted line $S_0$ thereon. The cutting edges $C_1$ and $C_2$ of the blank $B_1$ and $B_2$ are formed with the concavo-convex sides apart from the dotted line $S_0$, and these two edges $C_1$ and $C_2$ are complementary to each other. By attaching these two blanks $B_1$, $B_2$ on the inner lamina 201, 201 separately, two walls of the pool can be obtained by sealing along the line $S_0'$, $S_0''$.

Figure 1D:
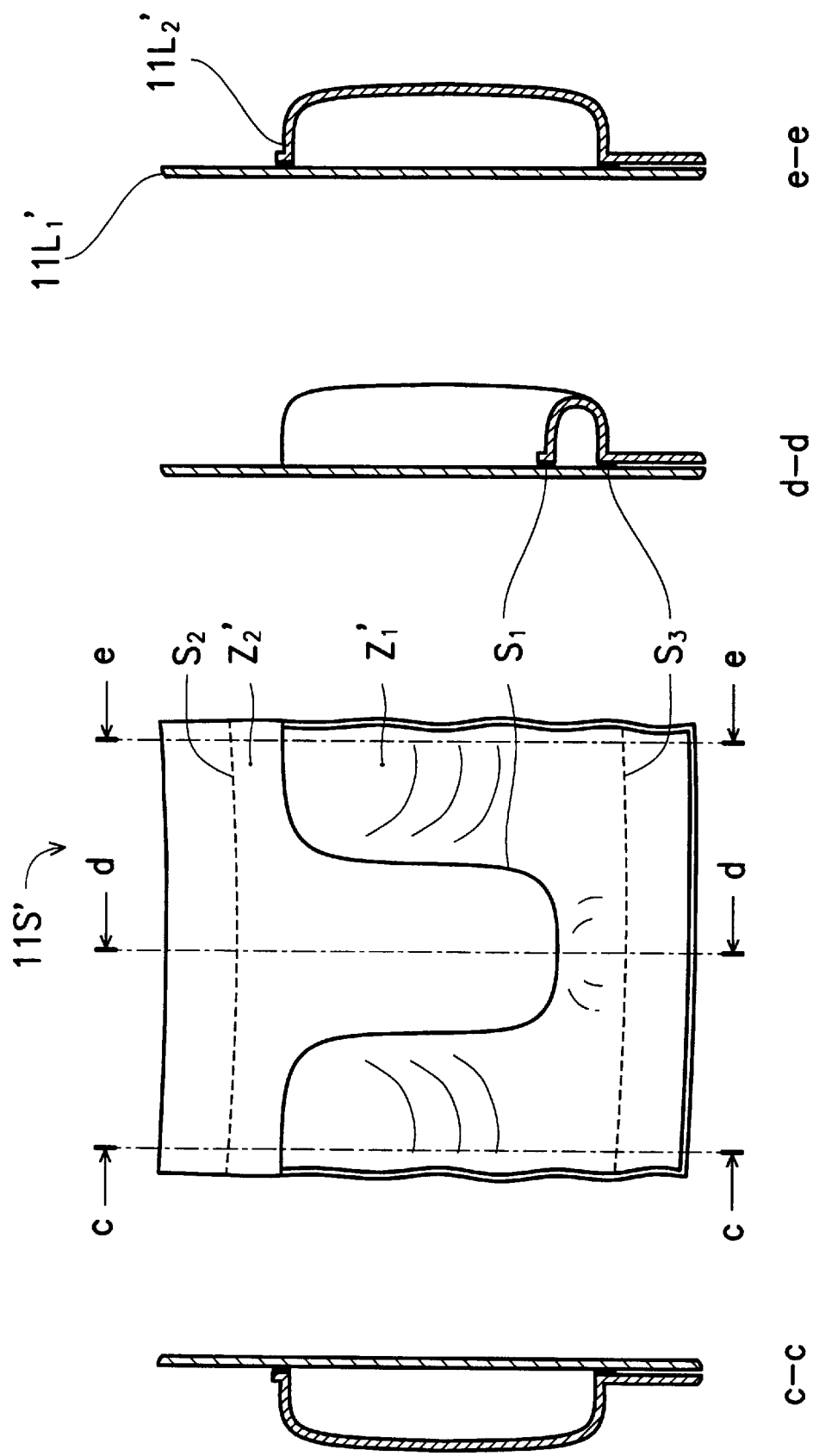
FIG. 1D is a schematic view showing the partial structure of the wall of the first embodiment according to the present invention.

FIG. 1D is a schematic view showing the partial portion 11S' of the wall of the first embodiment according to the present invention. As compared with FIG. 1B and FIG. 1C, it is obvious that the whole non-inflated zone $Z_2'$ shown in FIG. 1D is merely composed of one lamina of sheet bar from the Section c—c, Section d—d, and Section e—e along the line c—c, d—d, and e—e. This pool arranged by the interlocking method can also be maintained with a good strength in its flexible structure by a proper sealing along the lines $S_1$, $S_2$, and $S_3$ between the inner lamina $11L_1'$ and outer lamina $11L_2''$.

As a result, instead of using two laminas of sheet bar in the non-inflated zone of the conventional pool, the present invention makes the best of the sheet bar utilization by applying one lamina in the non-inflated zone according to the interlocking method with no scrap.

EMBODIMENT 2

Figure 2A:
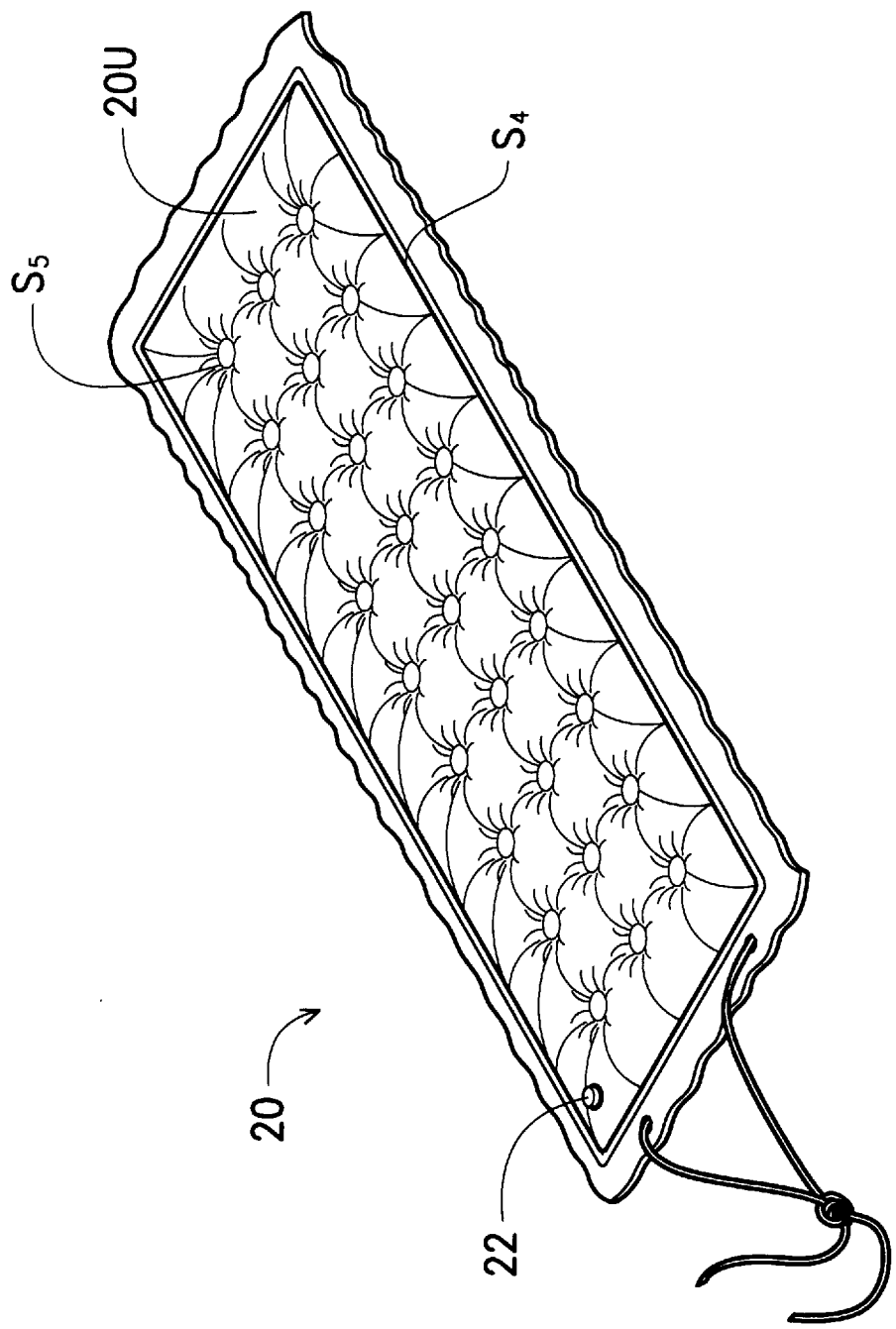
FIG. 2A is a perspective view showing the outline structure of the first conventional air bed.
Figure 2B:
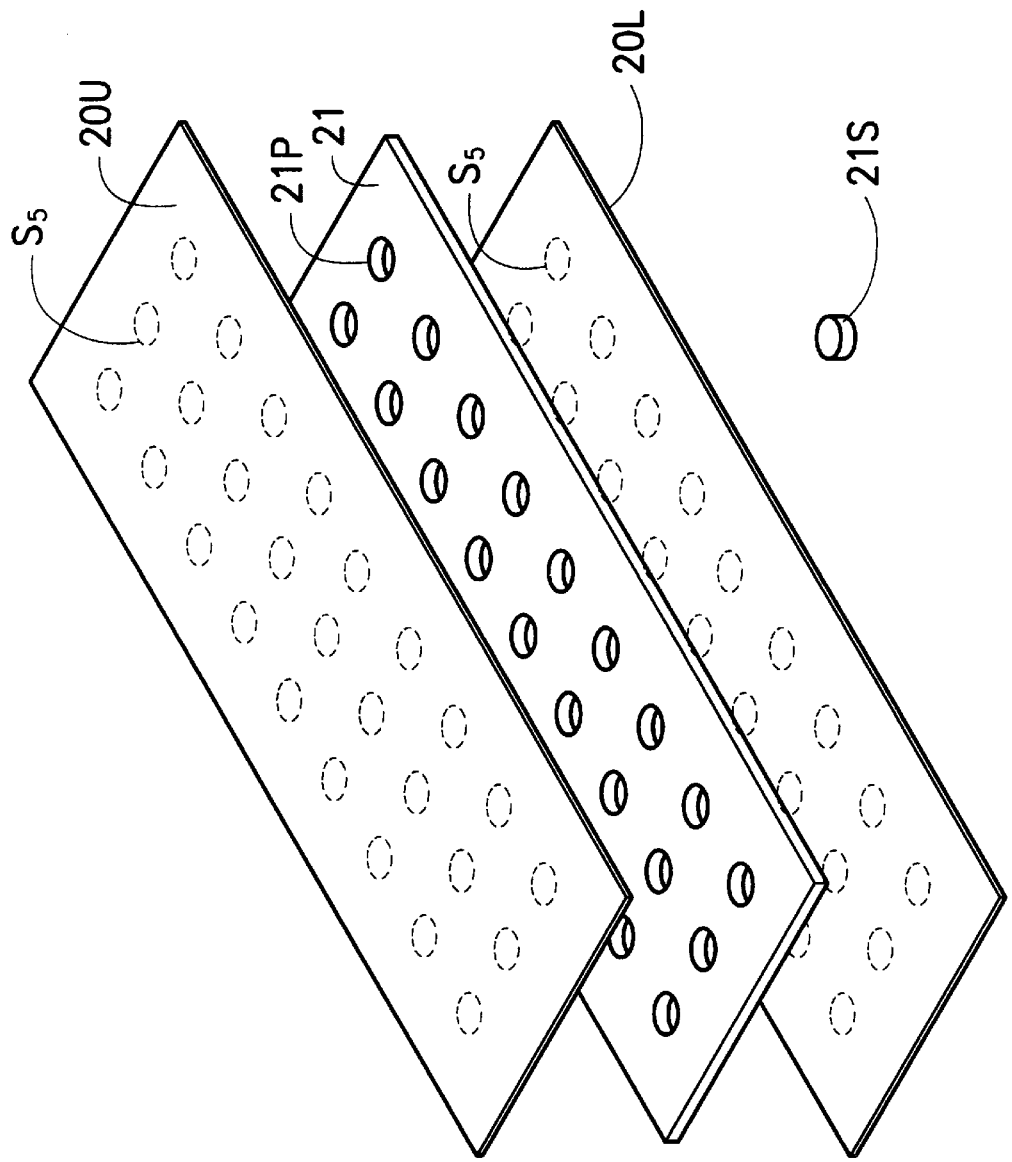
FIG. 2B is a schematic view showing the inner structure of the air bed shown in FIG. 2A.

Referring to the FIG. 2A and FIG. 2B simultaneously, FIG. 2A is a perspective view showing the outline structure of the first conventional air bed 20; FIG. 2B is a schematic view showing the inner structure of the air bed 20 shown in FIG. 2A. The air bed 20 is composed of three laminations: an upper lamina 20U, a lower lamina 20L and a cushion 21. The cushion 21, punched with several perforations 21P and served as a supporting structure, is installed between the upper lamina 20U and the lower lamina 20L, and then the air bed 20 is formed by sealing the upper lamina 20U and the lower lamina 20L together along the peripheral line $S_4$ and the plurality of circles $S_5$ thereon.

However, in the middle of punching these perforations from the sheet bar, there are a great deal of scraps 21S generated while the mass production of cushions 21. Further, these scraps 21S may be discarded when they are not further treated. Therefore, our environment will deteriorate if we are not given good care and take advantage of the sheet bar.

Figure 2C:
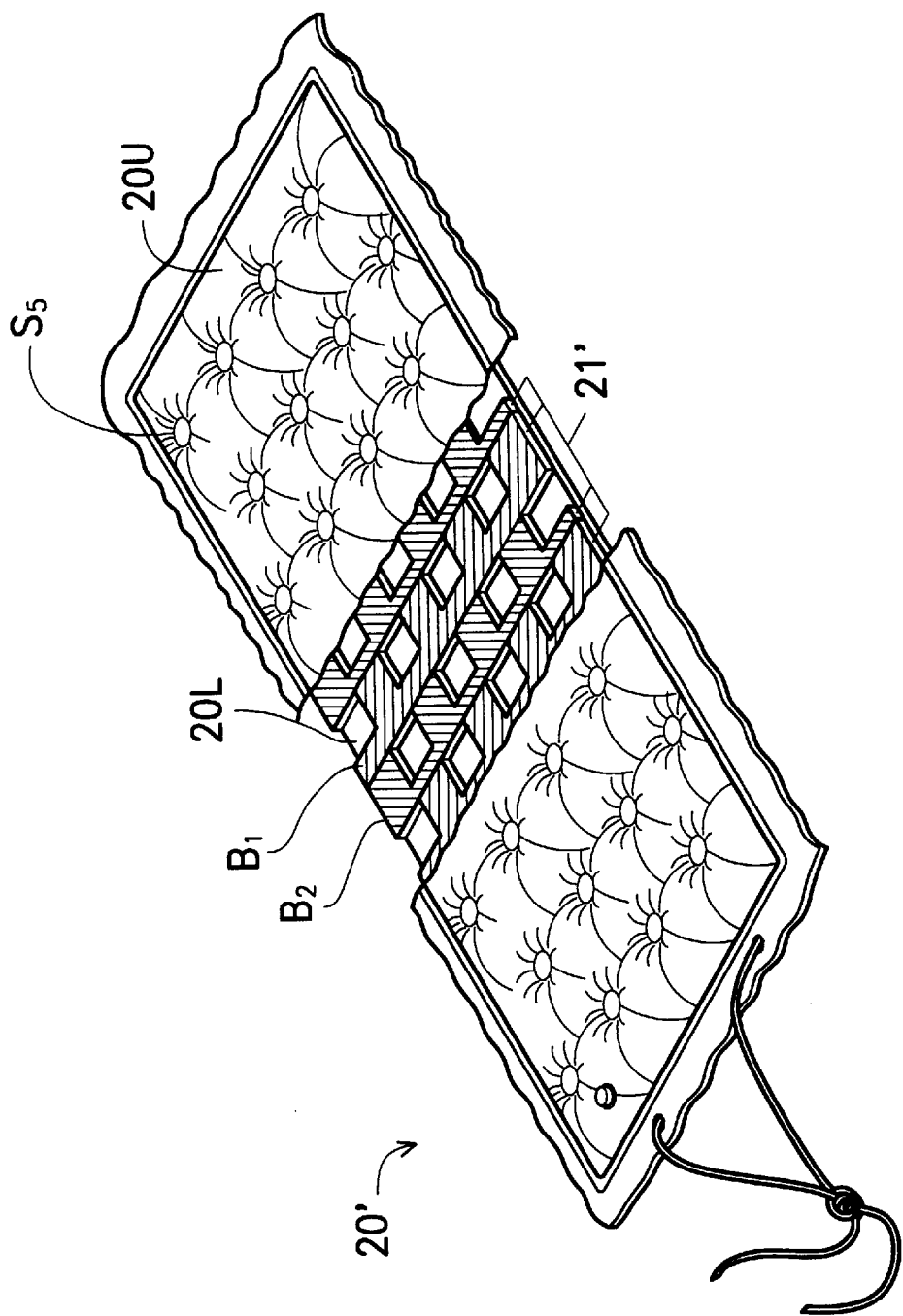
FIG. 2C is a partly sectional view showing the inner structure of the air bed according to the second embodiment of the interlocking method of the present invention.

FIG. 2C is a partly sectional view showing the inner structure of the air bed 20' according to the second embodiment of the interlocking method of the present invention.

Similarly, the outline structure of the air bed 20' is the same as that the air bed 20 shown in FIG. 2A with an essential difference being that the structure of the cushion 21' is arranged by the interlocking method.

Figure 2D:
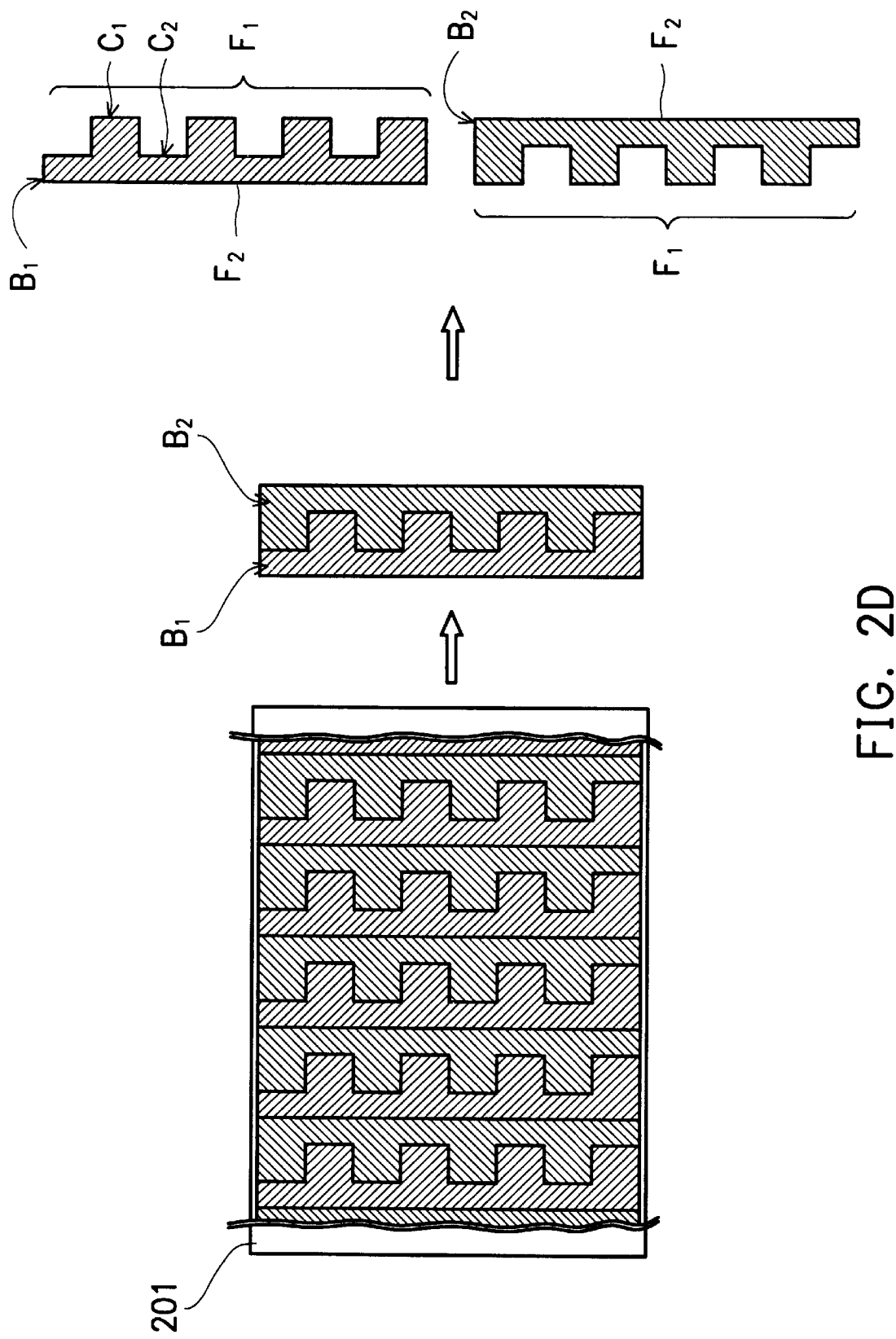
FIG. 2D is a schematic flow chart showing the process of blanking the sheet bar being as a combined cushion of the air bed.

The blank $B_1$ and $B_2$ are pressed from the sheet bar 201 with a series of complementary arrangement shown in FIG. 2D. The concavo-convex side $F_1$ is formed on one side of the blank $B_1$ and $B_2$, and the smooth side $F_2$ is formed on the opposite side of the blank $B_1$ and $B_2$. The blank $B_1$ and $B_2$ are complementary to each other when they are engaged by its concavo-convex sides $F_1$, $F_1$. Each concavo-convex side $F_1$ is composed of a plurality of convexities $C_1$ and concavities $C_2$ which are formed at regular intervals.

Figure 2E:
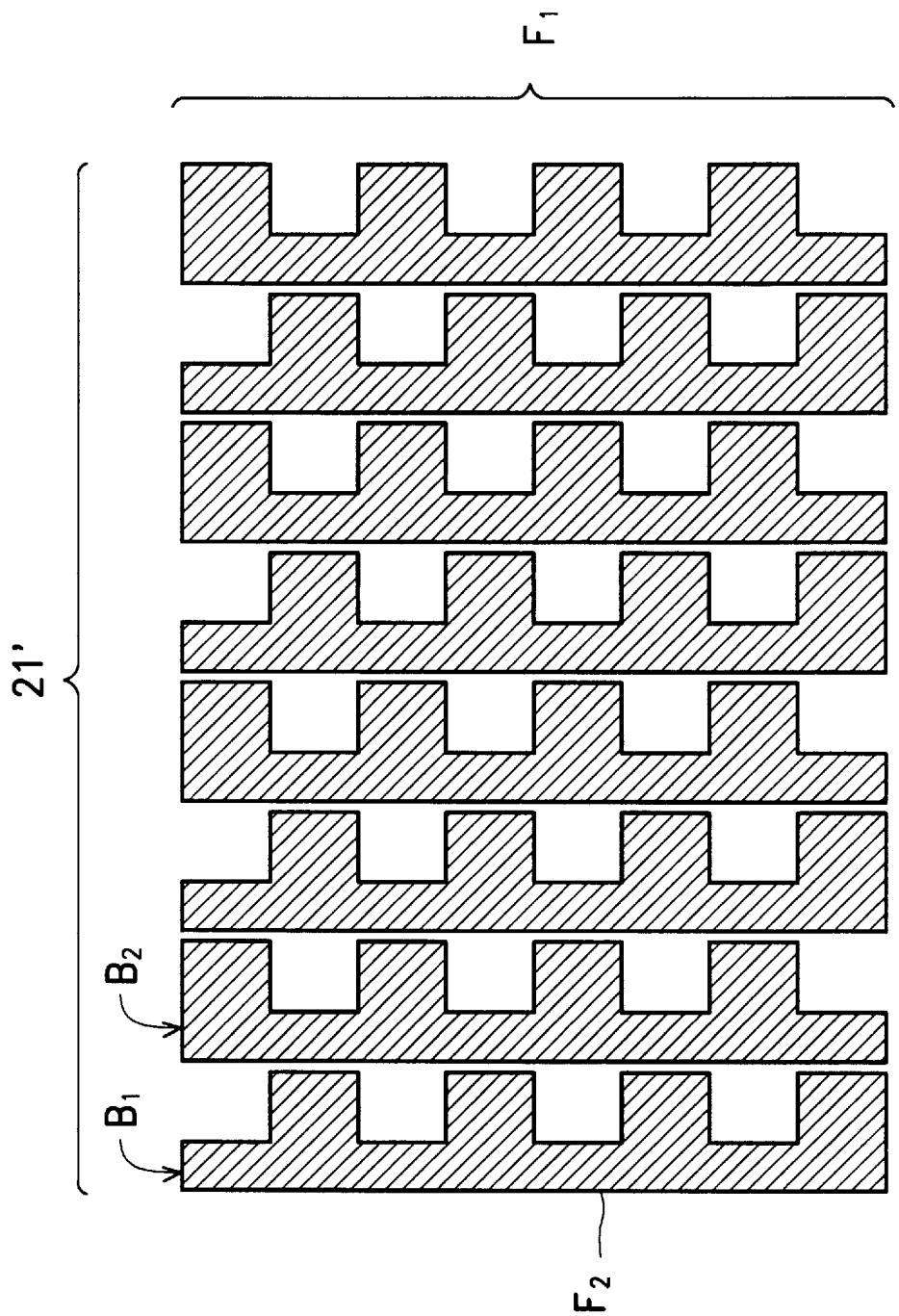
FIG. 2E is a plan view showing the arrangement of the blanks as the combined cushion according to the interlocking method of the present invention.

Therefore, according to the interlocking method of the present invention, the combined cushion 21' as shown in FIG. 2E can be obtained by allocating and connecting the prescribed numbers of the blanks $B_1$, $B_2$ adjacent to each other alternatively. All the concavities $C_2$ between any two convexities $C_1$, $C_1$ can be used as the spaces which are provided for sealing the upper lamina 20U and the lower lamina 20L together with the circles $S_5$.

EMBODIMENT 3

Figure 3A:
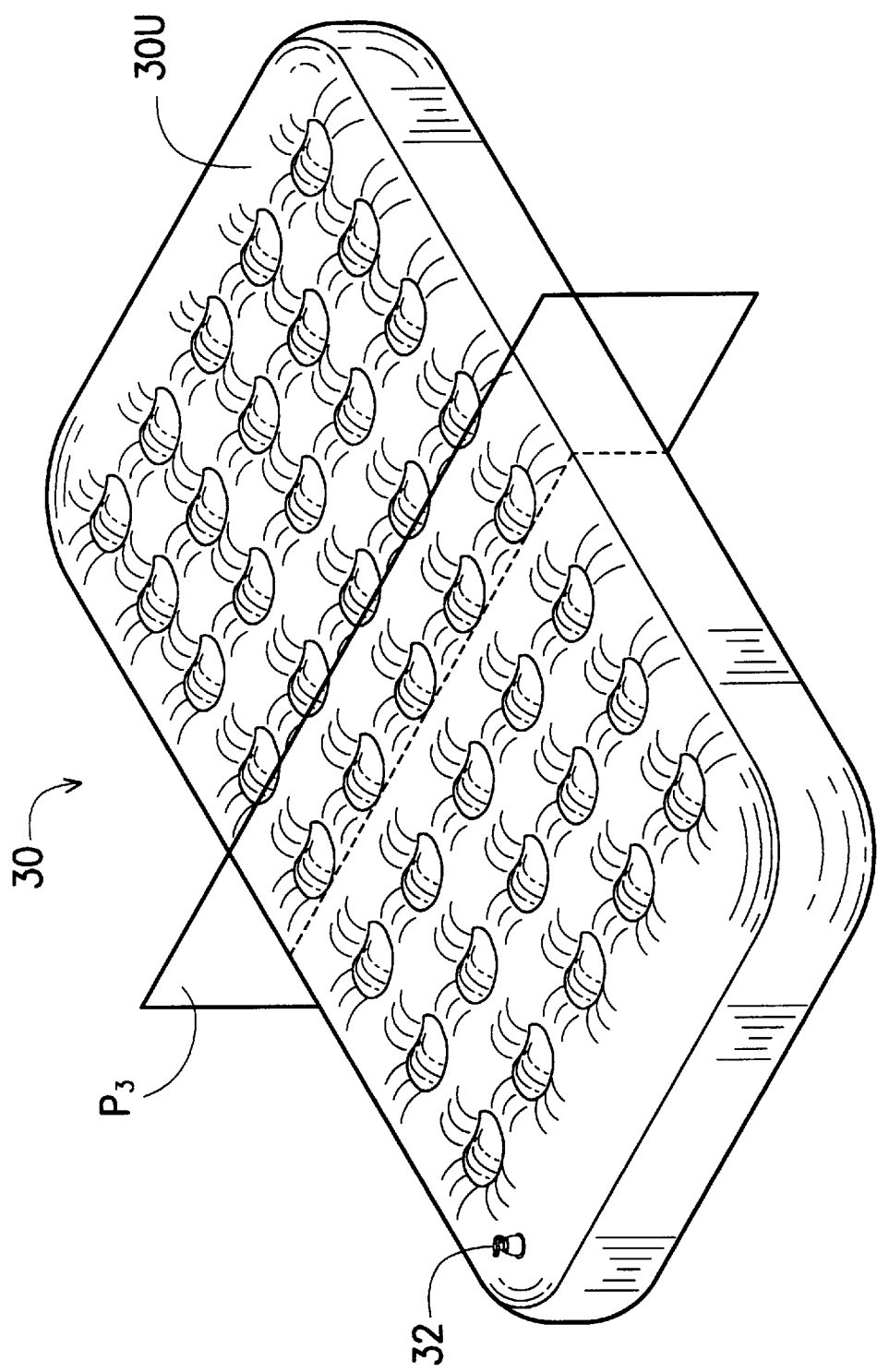
FIG. 3A is a perspective view showing the outline structure of the second conventional air bed.
Figure 3B:
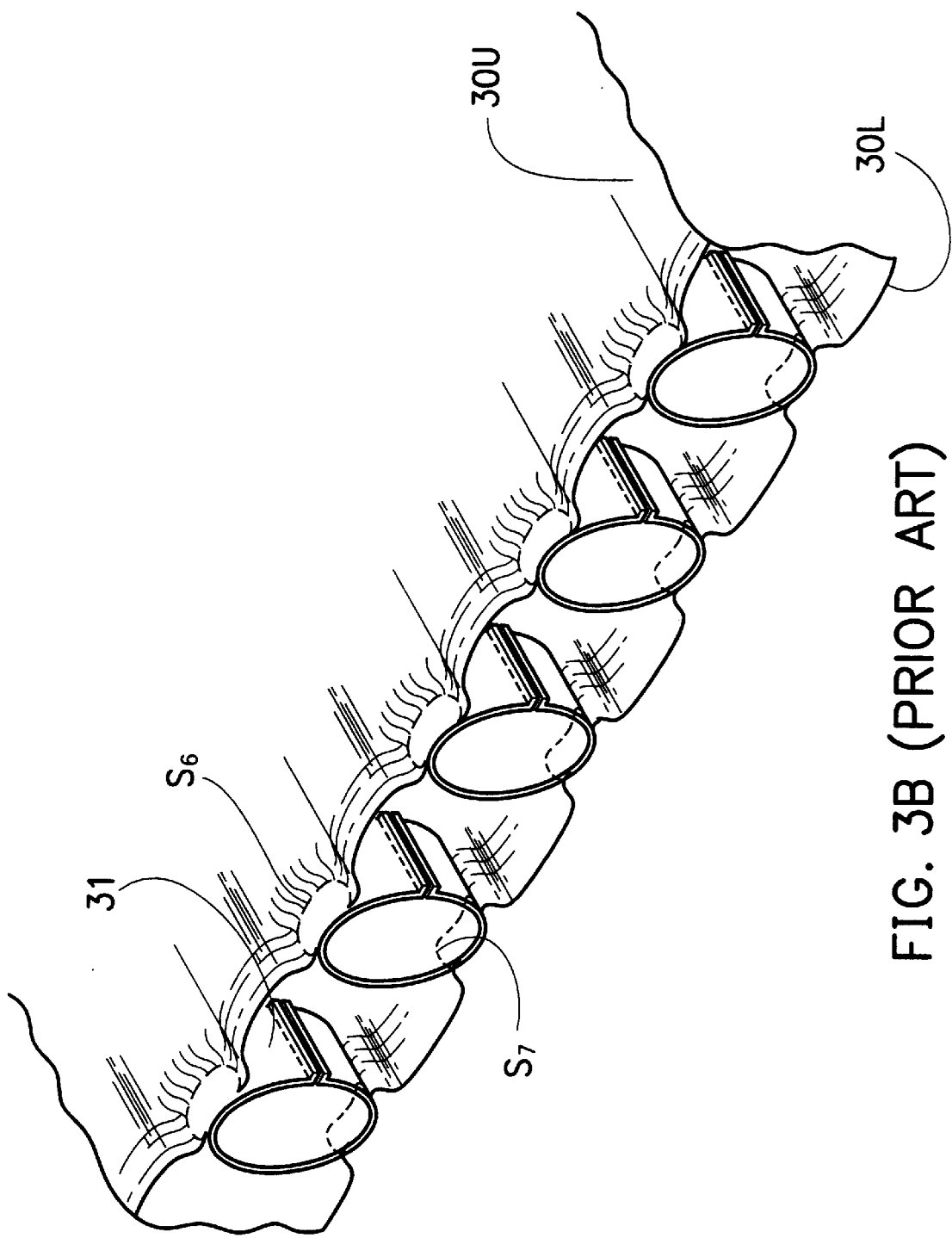
FIG. 3B is a section view showing the inner structure of the air bed from the plane $P_3$ represented on FIG. 3A.

Referring to FIG. 3A and FIG. 3B simulanteously, FIG. 3A is a perspective view showing the outline structure of the second conventional air bed 30; FIG. 3B is a section view showing the inner structure of the air bed from the plane $P_3$ represented in FIG. 3A. The supporting structure of the air bed 30 is uniformly installed with a plurality of coils 31 therein. The upper lamina 30U and the lower lamina 30L are individually jointed to the all coils 31 with the sealed lines $S_6$, $S_7$ located at circumferential surface of each coil 31. After pumping the air into the air bed 30 through the valve 32, the coils 31 can position the upper lamina 30U and the lower lamina 30L without distortion.

Figure 3C:
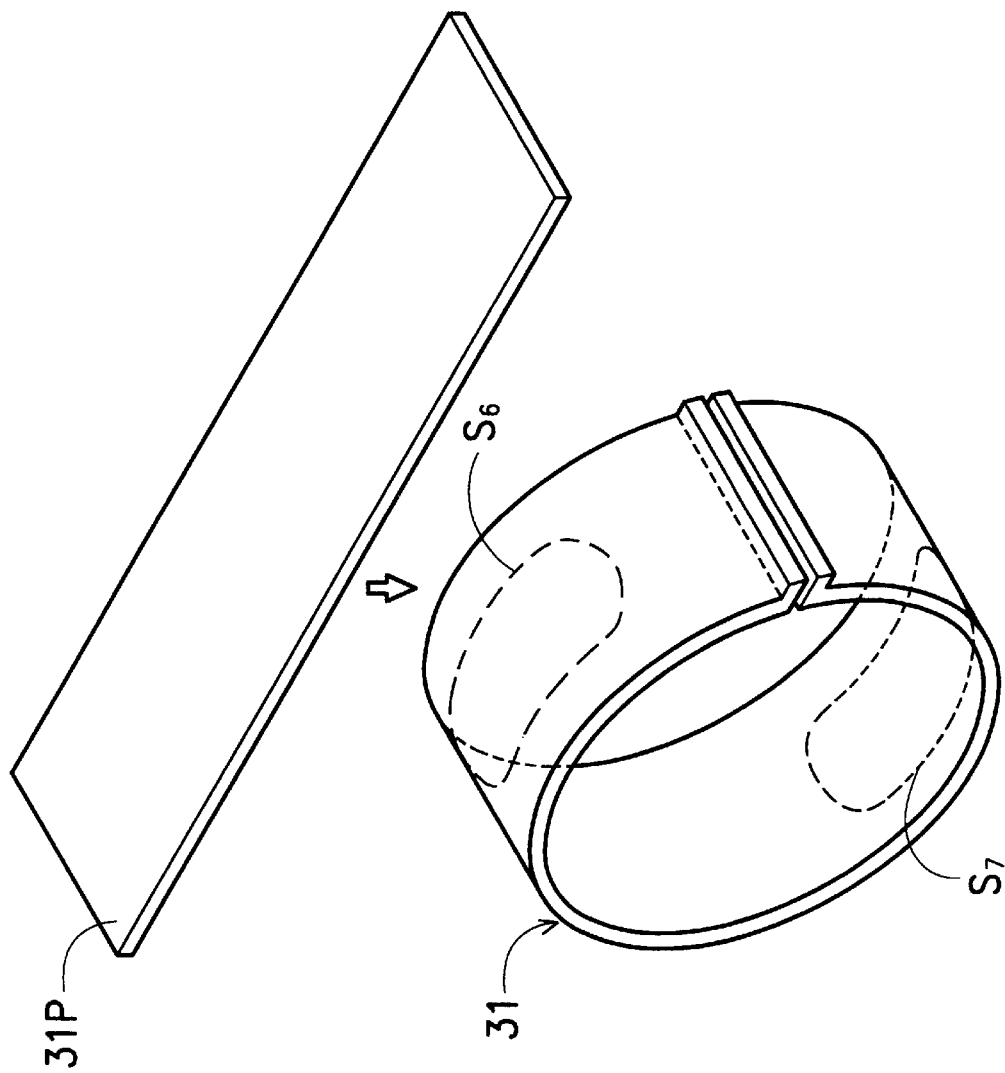
FIG. 3C is a perspective view showing the structure of one coil represented on FIG. 3B.

The coil 31 is formed by a rectangular plate 31P as shown in FIG. 3C. Two ends of the rectangular plate 31P are connected by sealing.

However, as far as the transverse section shown in FIG. 3B is concerned, these coils 31 are not only with many inconvenient factors (such as the installation of these coils 31) in the sealing process, but also the supporting area along the row of the coils 31 are with an intermittent allocation. Therefore, the average life of the coils 31 may be decreased.

In view of the aforementioned problems, the annular tension belt is provided by the interlocking method.

Figure 3D:
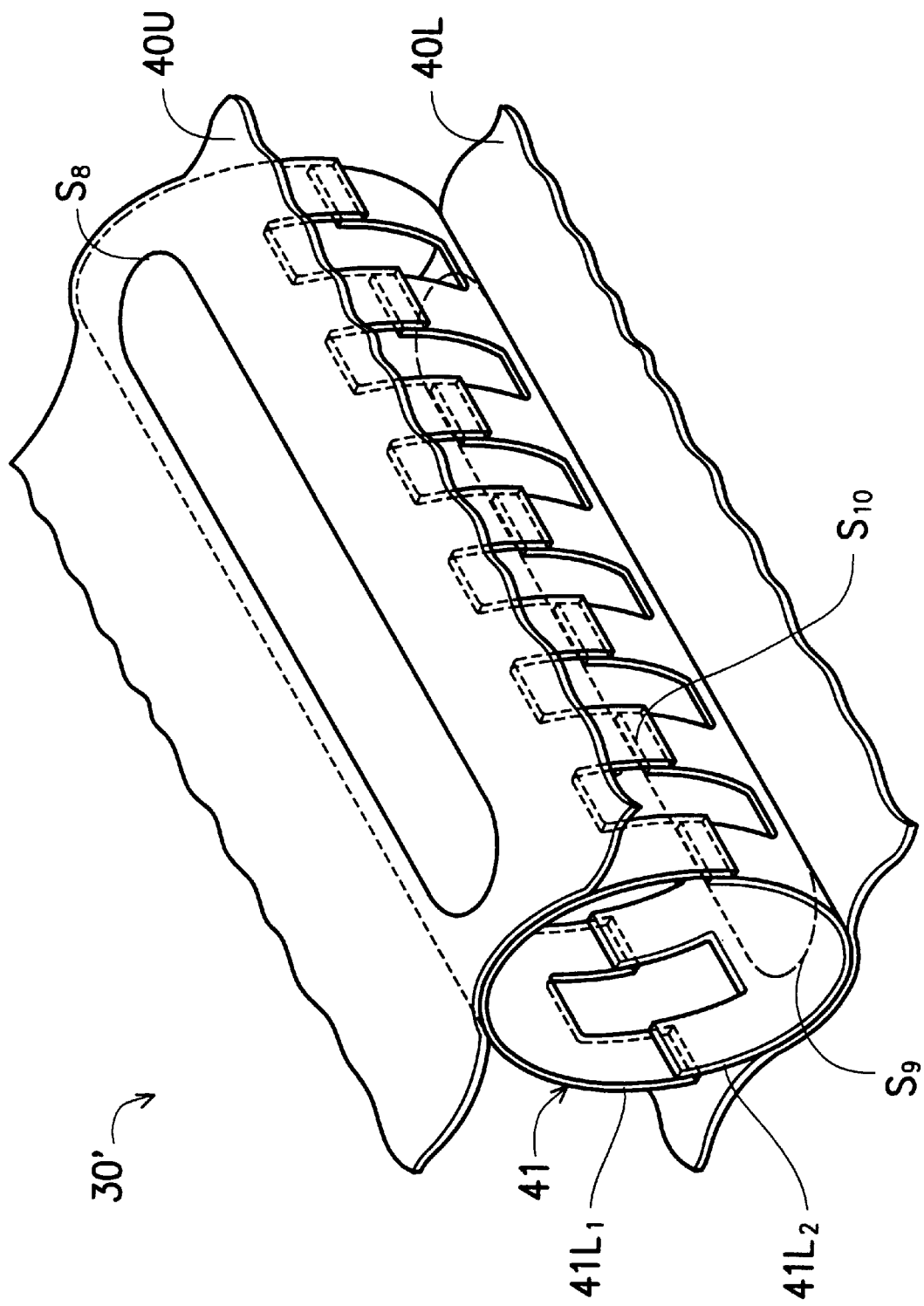
FIG. 3D is a partly schematic view showing the inner structure with an annular tension belt according to the third embodiment of the present invention.

FIG. 3D is a partly schematic view showing the inner structure of the air bed 30' with an annular tension belt 41 served as the supporting structure according to the third embodiment of the present invention. This annular tension belt 41 is formed with a shape similar to an elliptical cylinder while the air bed has been inflated. The upper lamina 40U and the lower lamina 40L are separately connected to the annular tension belt 41 with the sealed lines $S_8$, $S_9$ thereon. As a consequence, the actual mean pressure acting on each annular tension belt 41 of the air bed 30' is more uniform than the one acting on each coils 31 shown in FIG. 3B with intermittent arrangement.

Figure 3E:
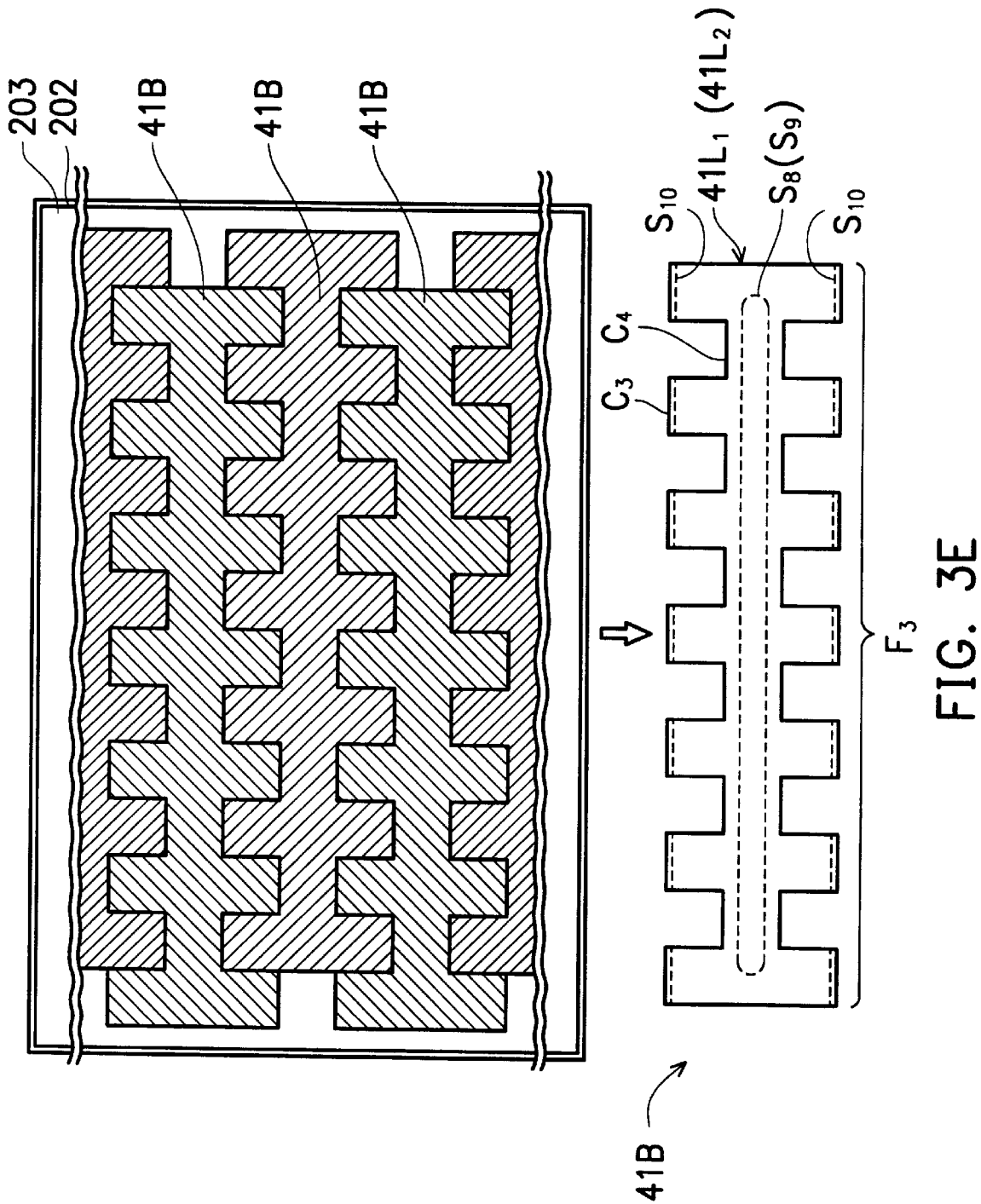
FIG. 3E is a plan view showing the blanking of the annular tension belts.
Figure 3F:
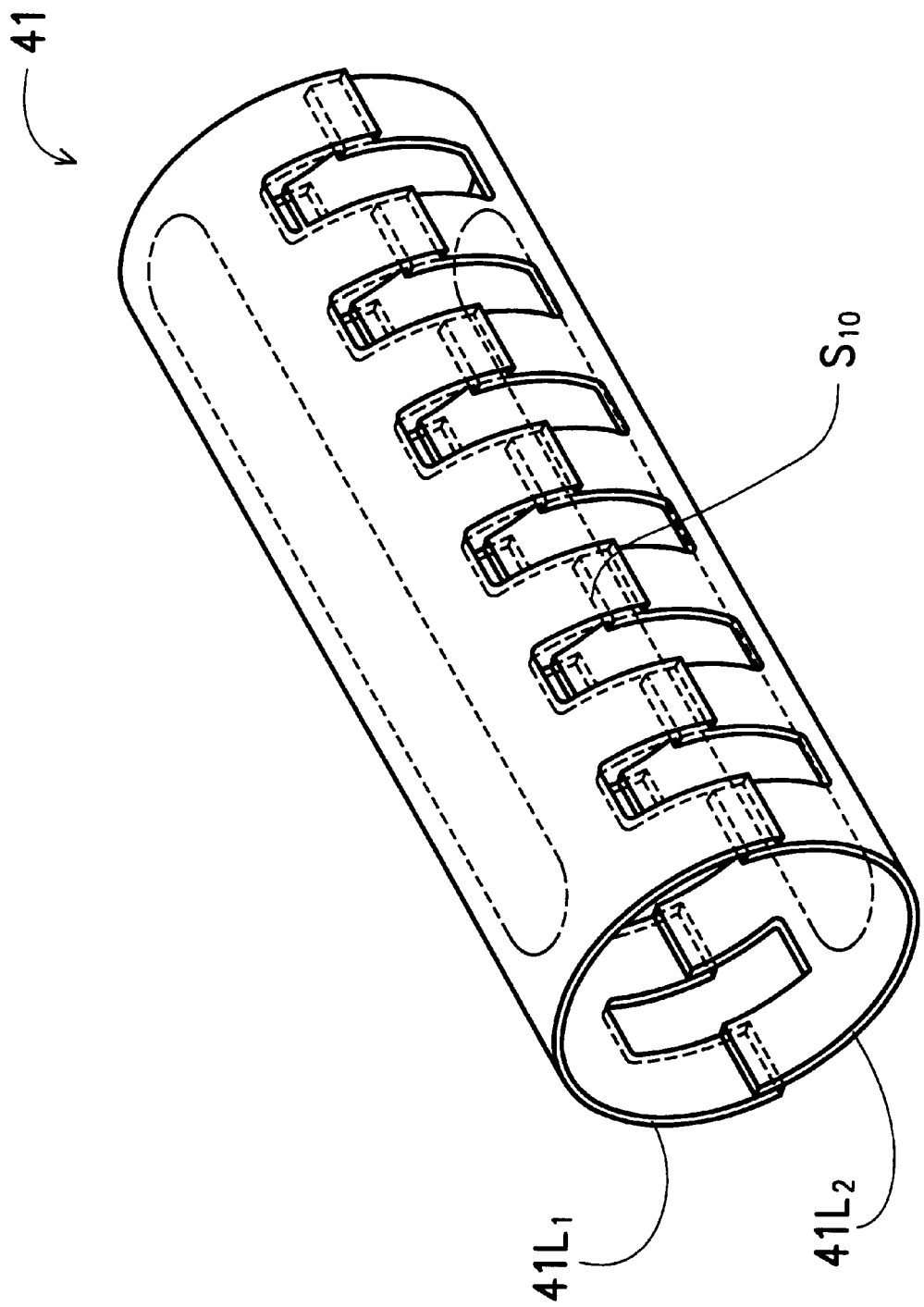
FIG. 3F is a perspective view showing the structure of one annular tension belt.

Referring to FIG. 3E and FIG. 3F, FIG. 3E is a plan view showing the pressing of the blanks 41B from the sheet bars 202, 203; FIG. 3F is a perspective view showing the outline structure of the annular tension belt 41.

Each annular tension belt 41 made of blank 41B which has two layers pressing from the sheet bars 202 and 203: a first layer $41L_1$ and a second layer $41L_2$ which are have two continuous concavo-convex sides along its longitudinal direction thereon. The ends of all the convexities $C_3$ of the lamination $L_1$ and $L_2$ are sealed together along the lines $S_{10}$ thereon. Therefore, the first layer $41L_1$ and the second layer $41L_2$ can be jointed together properly, and the strength of the air bed 40 is greatly improved because of the increased supporting area of the annular tension belt 41.

EMBODIMENT 4

Hereinafter, another general type of the tension belt will be described in FIG. 4A, and the interlocking tension belt will also be introduced in FIG. 4B to FIG. 4G.

Figure 4A:
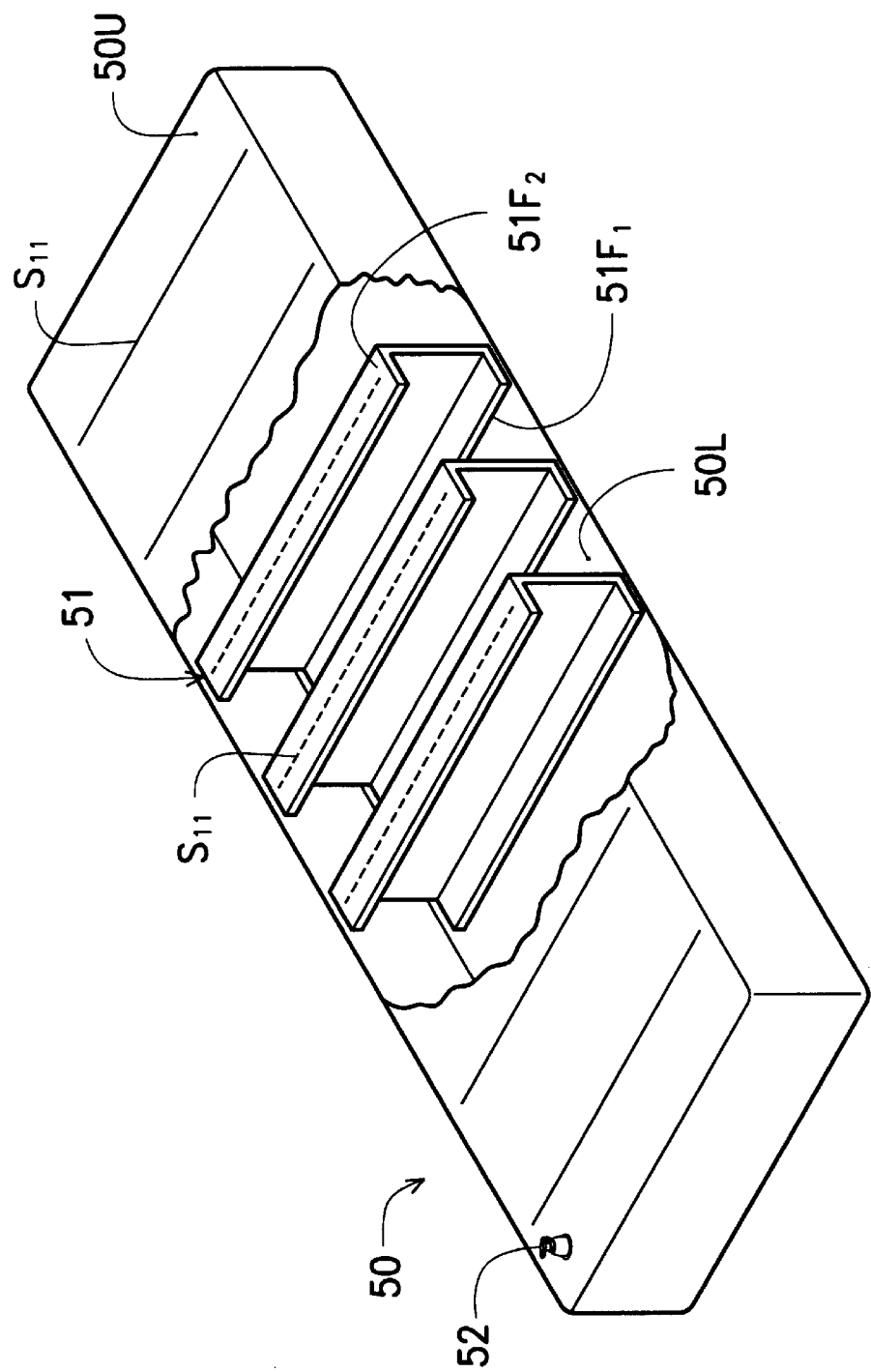
FIG. 4A is a partly sectional view showing the structure of the second conventional air bed.

FIG. 4A is a partly sectional view showing the inner structure of the second conventional air bed 50. The air bed 50 is supported with a plurality of U-type tension belts 51. The upper lamina 50U and the lower lamina 50L are separately jointed to the corner plates $51F_1$, $51F_2$ of the U-type tension belts 51 along the sealed lines $S_{11}$.

Although the U-type tension belts 51 can stably support the weight applying on the air bed 50 by its uniform sectional structure, the U-type tension belt 51 cannot effectively and economically diminish the usage of material.

Figure 4B:
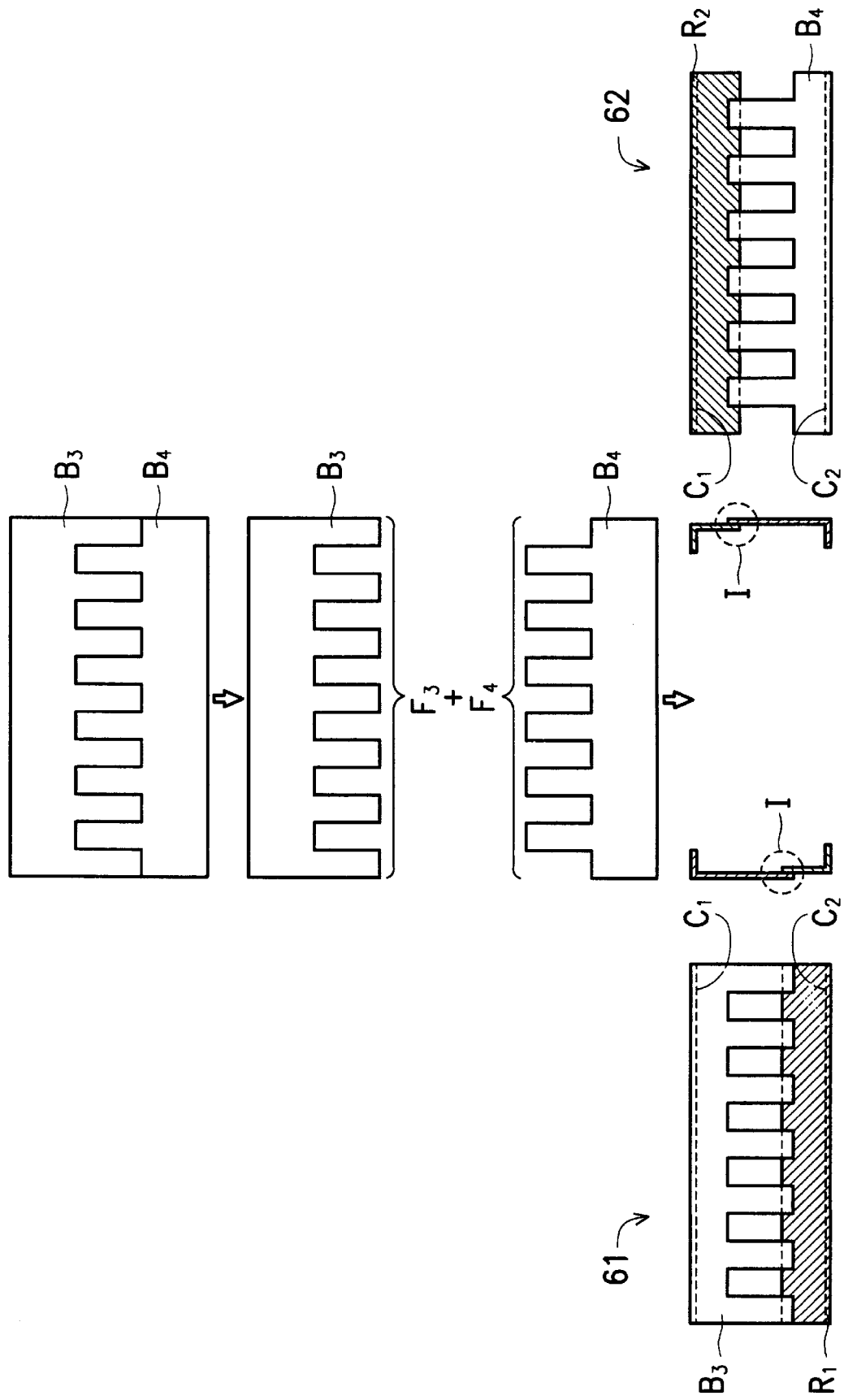
FIG. 4B is a plan view showing the manufacturing process of the overlapping-sealed tension belts according to the interlocking method of the present invention.
Figure 4C:
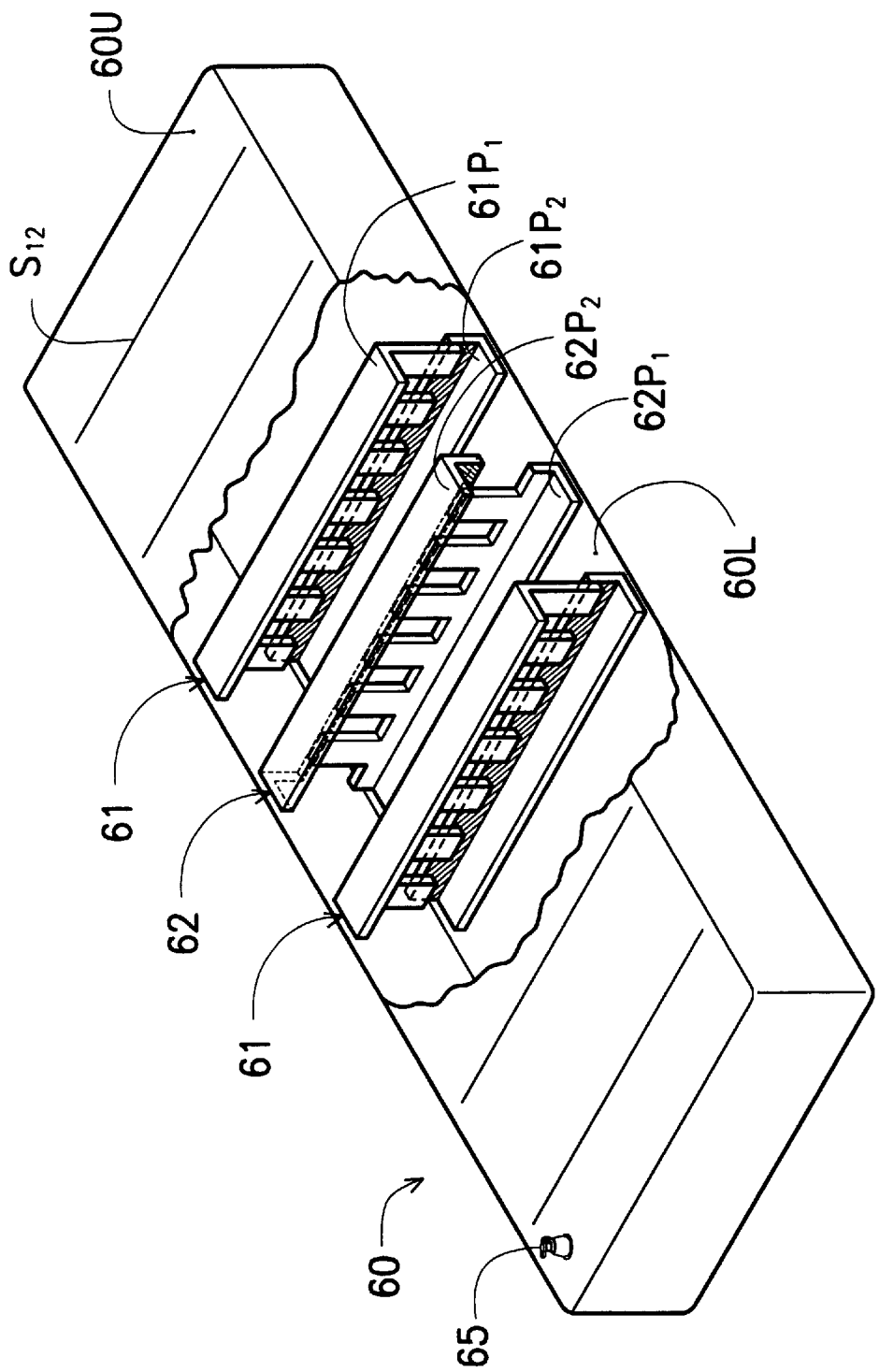
FIG. 4C is a partly sectional view showing the structure of the air bed with an alternative arrangement of the overlapping-sealed tension belts therein according to the fourth embodiment of the present invention.
Figure 4D:
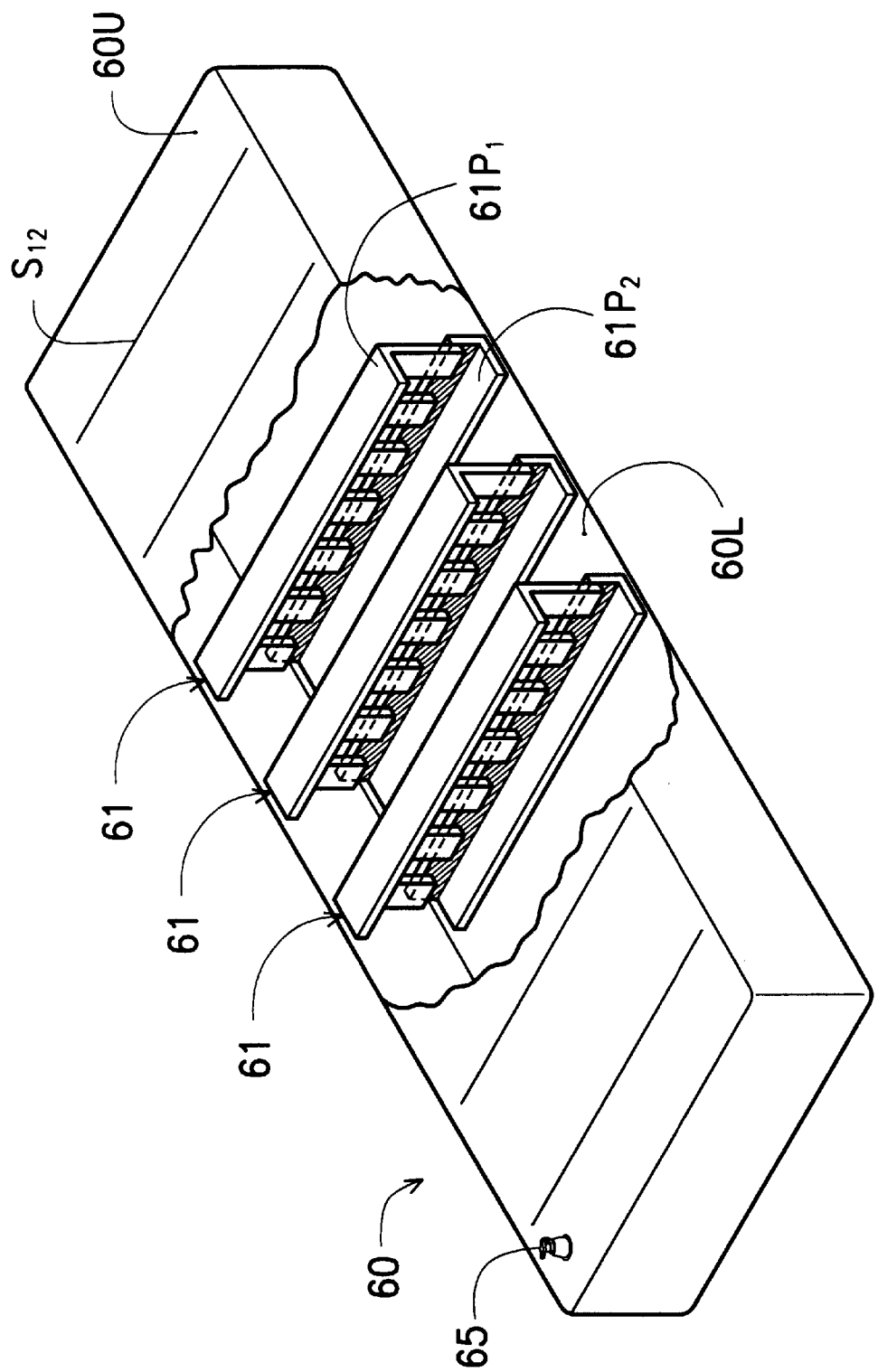
FIG. 4D represents another method with a regular arrangement of the overlapping-sealed tension belts of FIG. 4C.

Referring to FIGS. 4B–4D simultaneously, FIG. 4B is a plan view showing the manufacturing process of the overlapping-sealed tension belts 61, 62 according to the interlocking method of the present invention; FIG. 4C and FIG. 4D individually represent the alternative and regular arrangement of the overlapping-sealed tension belts 61, 62 according to the fourth embodiment of the present invention.

Both the blank $B_3$ and $B_4$ are formed with the concavo-convex side $F_3$ and $F_4$ by pressing, wherein the concavo-convex side $F_3$ and $F_4$ are complementary to each other. Then, using the joint member $R_1$ and $R_2$ as the reinforcement individually connecting to the concavo-convex side $F_3$ and $F_4$ of the blank $B_3$ and $B_4$ with the overlapping-sealed method I, the overlapping-sealed tension belts 61, 62 are completed.

Referring to FIG. 4C, after two longitudinal ends of each overlapping-sealed tension belt 61, 62 have bent into being as the corner plates $61P_1$, $61P_2$ and $61P_1$, $61P_2$ along the folding lines $C_1$ and $C_2$, these overlapping-sealed tension belts 61, 62 are allocated at predetermined intervals in the longitudinal direction of the air bed 60, and then the upper lamina 60U and the lower lamina 60L are separately jointed to the corner plates $61P_1$ and $61P_2$ of each belt 61 by sealing along the line $S_{12}$. Another arrangement of these overlapping-sealed tension belts 61, as shown in FIG. 4D, are allocated at predetermined intervals in the longitudinal direction of the air bed 60.

Figure 4E:
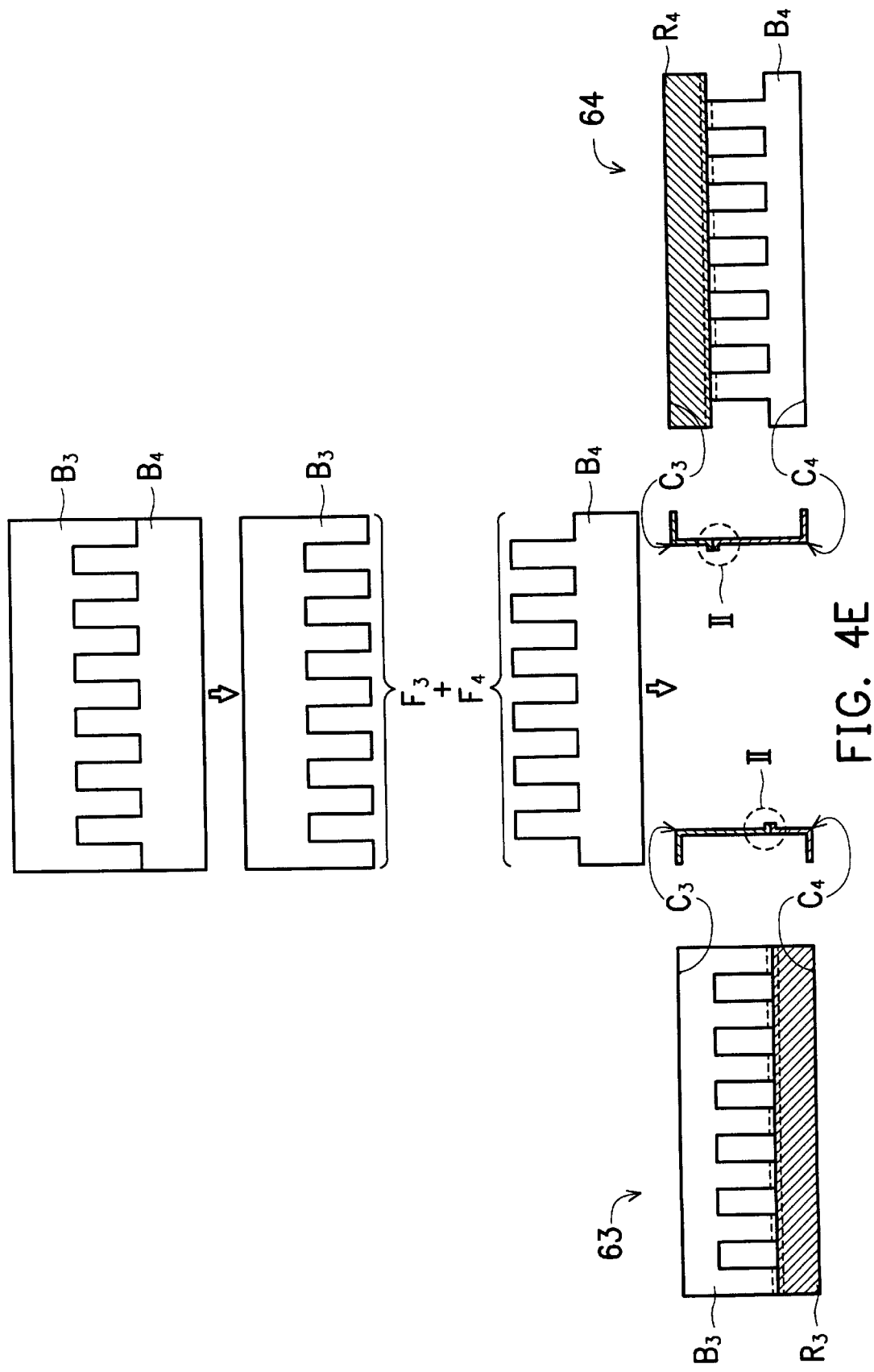
FIG. 4E is a plan view showing the manufacturing process of the cutting-sealed tension belts according to the interlocking method.
Figure 4F:
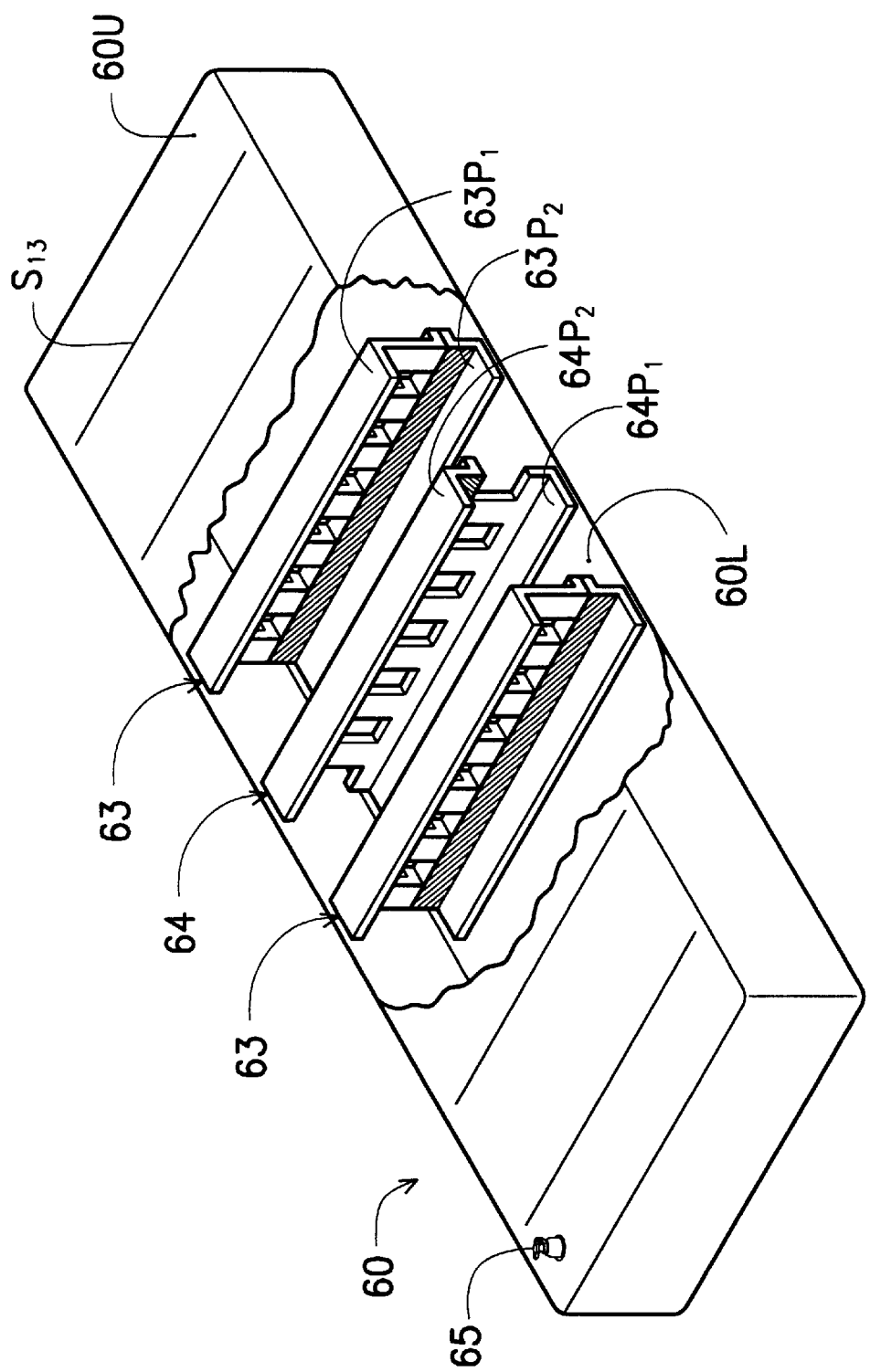
FIG. 4F is a partly sectional view showing the structure of the air bed with an alternative method of the cutting-sealed tension belts therein according to the fourth embodiment of the present invention.
Figure 4G:
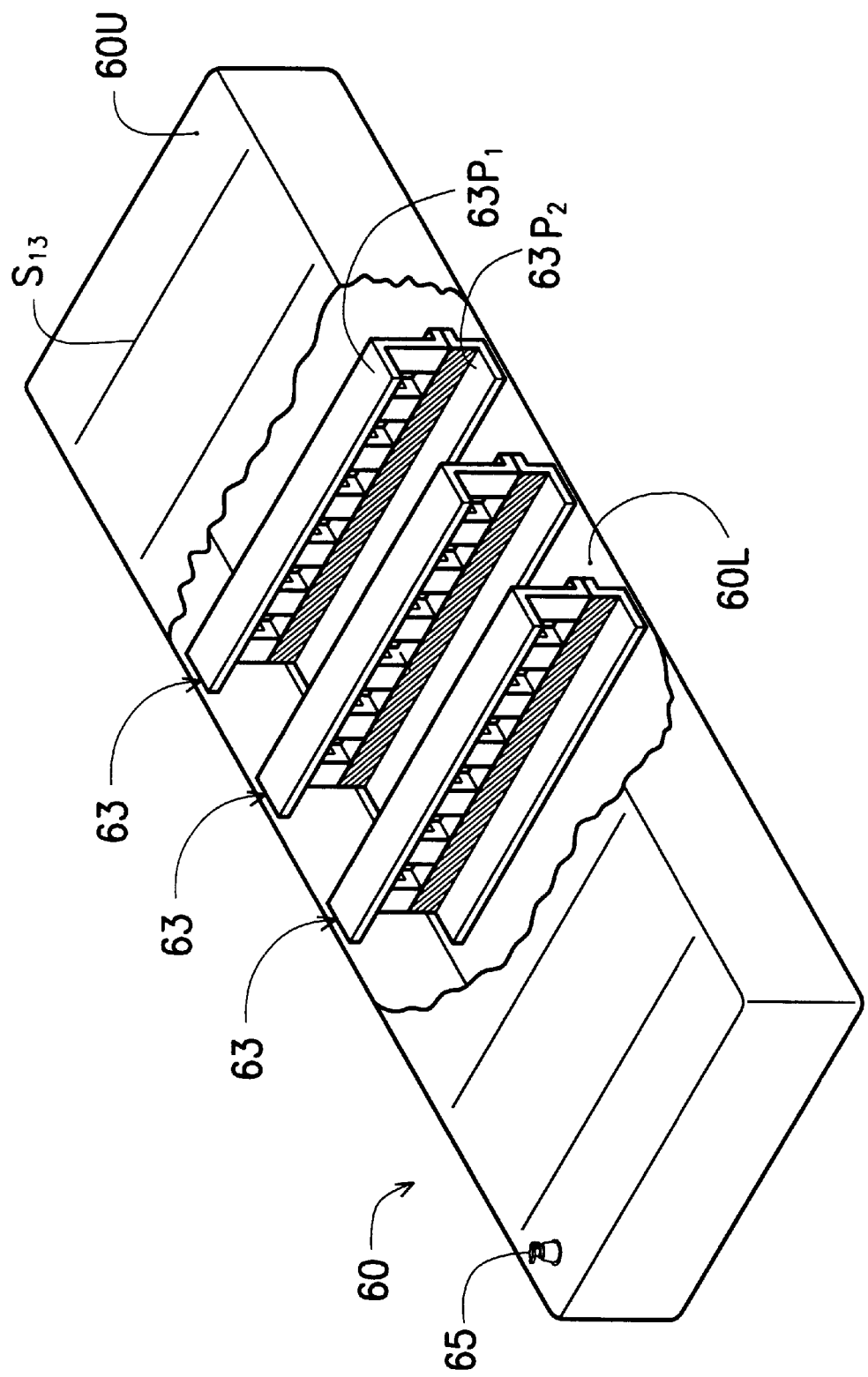
FIG. 4G represents another method with a regular arrangement of the cutting-sealed tension belts of FIG. 4F.

Referring to FIGS. 4E–4G simultaneously, FIG. 4E is a plan view showing the manufacturing process of the cutting-sealed tension belts 63, 64 according to the interlocking method of the present invention; FIG. 4F and FIG. 4G individually represent the alternative and regular arrangement of the overlapping-sealed tension belts according to the fourth embodiment of the present invention.

Then, using the joint member $R_3$ and $R_4$ individually joint to the concavo-convex side $F_3$ and $F_4$ of the blank $B_3$ and $B_4$ with the cutting-sealed method II, the cutting-sealed tension belts 63, 64 are completed.

Referring to FIG. 4F, after two longitudinal ends of each cutting-sealed tension belt 63, 64 have bent into being as the corner plates $63P_1$, $63P_2$ and $64P_1$, $64P_2$ along the folding lines $C_3$ and $C_4$, these cutting-sealed tension belts 63, 64 are allocated alternatively at predetermined intervals in the longitudinal direction of the air bed 60', and then the upper lamina 60U and the lower lamina 60L are separately jointed to the corner plates $63P_1$ and $63P_2$ of each belt 63, 64 by sealing along the lines $S_{13}$. Another arrangement of these cutting-sealed tension belts 63, as shown in FIG. 4G, are regularly allocated at predetermined intervals in the longitudinal direction of the air bed 60'.

EMBODIMENT 5

In the embodiment 5, we will focus on three Examples of the air-mattress according to the interlocking method.

Figure 5A:
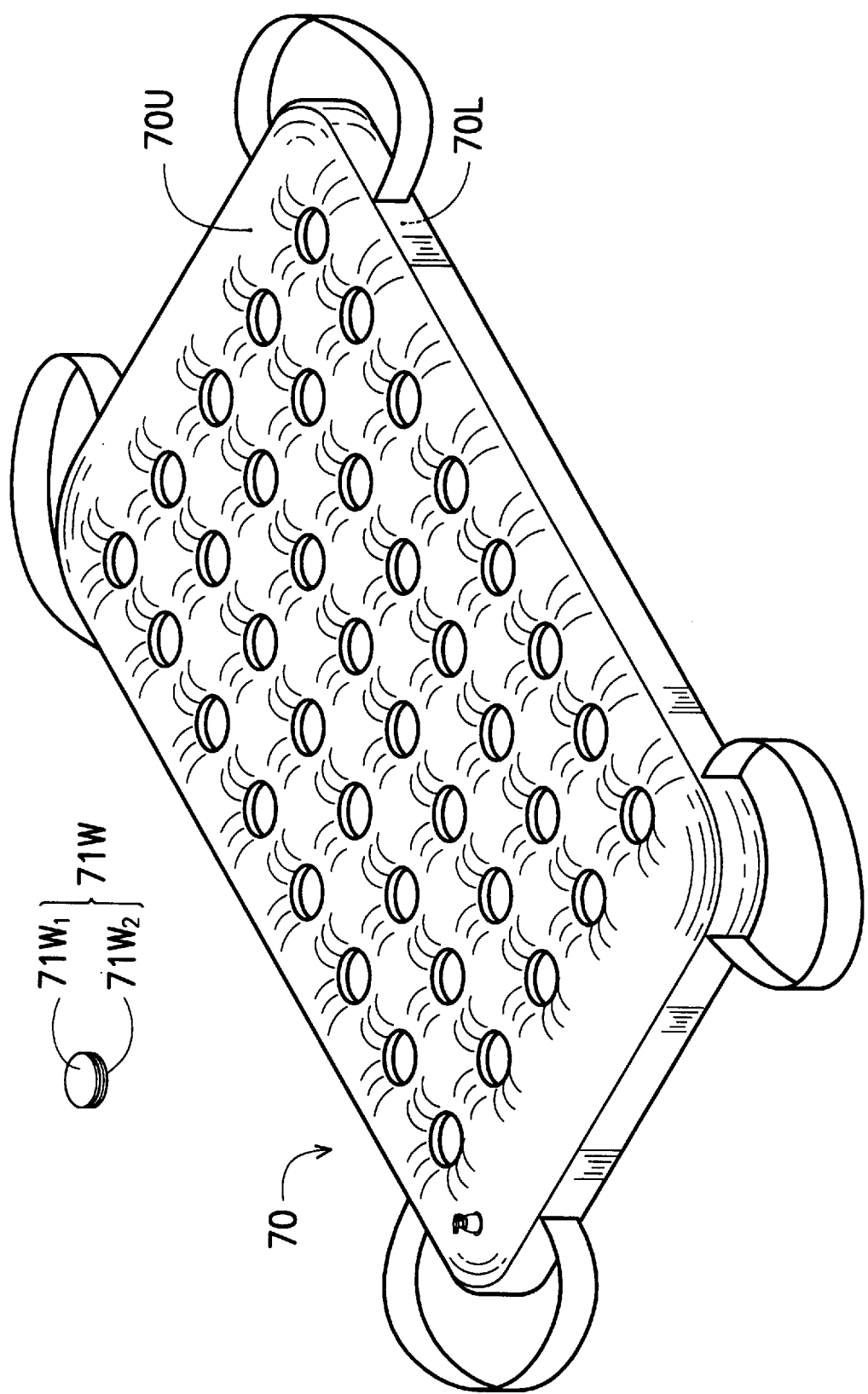
FIG. 5A is a perspective view showing the structure of the conventional air mattress.

Referring to FIG. 5A, FIG. 5A is a perspective view showing the structure of the conventional air mattress 70. The air mattress 70 is composed of an upper lamina 70U and a lower lamina 70L which are sealed together and formed a chamber therebetween. A plurality of scrap 71W ($71W_1$, $71W_2$) are detached when the sealing process applying on the upper lamina 70U and the lower lamina 70L is completed. These waste scraps 71W in general are discarded without reusing and recycling.

In view of the shortage of material and the increasing of environmental conscious, the interlocking air-mattress according to the present invention will be described in three Examples 1–3 hereafter.

EXAMPLE 1

Figure 5B:
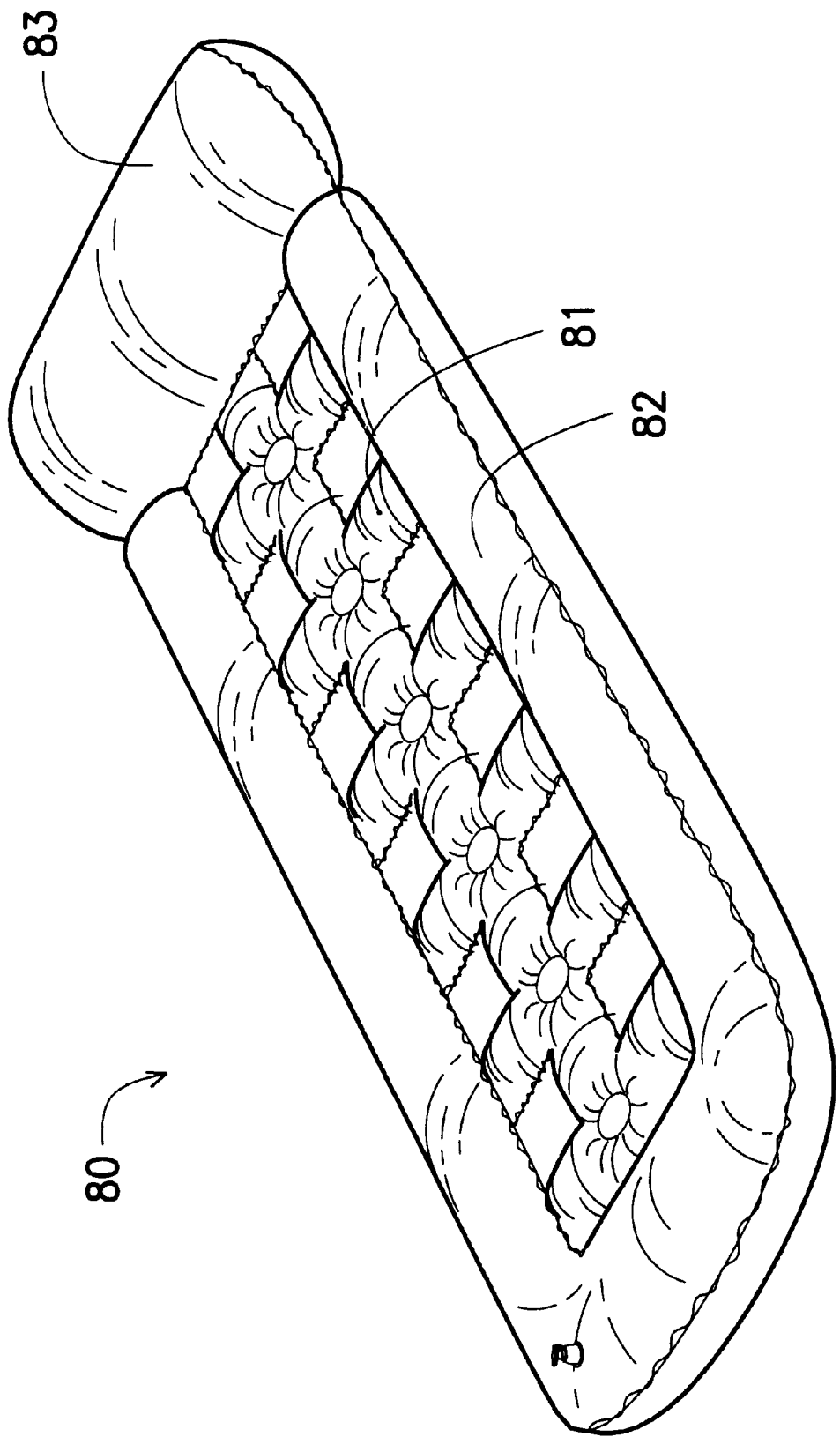
FIG. 5B is a perspective view showing the structure of an air mattress as Example I according to the fifth embodiment of the present invention.

FIG. 5B is a perspective view showing the structure of an interlocking air-mattress 80 as Example 1 according to the fifth embodiment of the present invention. The air-mattress 80 comprises a main chamber 81, a side chamber 82, and a pillows 83, wherein the main chamber 81 is wrapped all around by the side chamber 82 and the pillow 83.

Figure 5C:
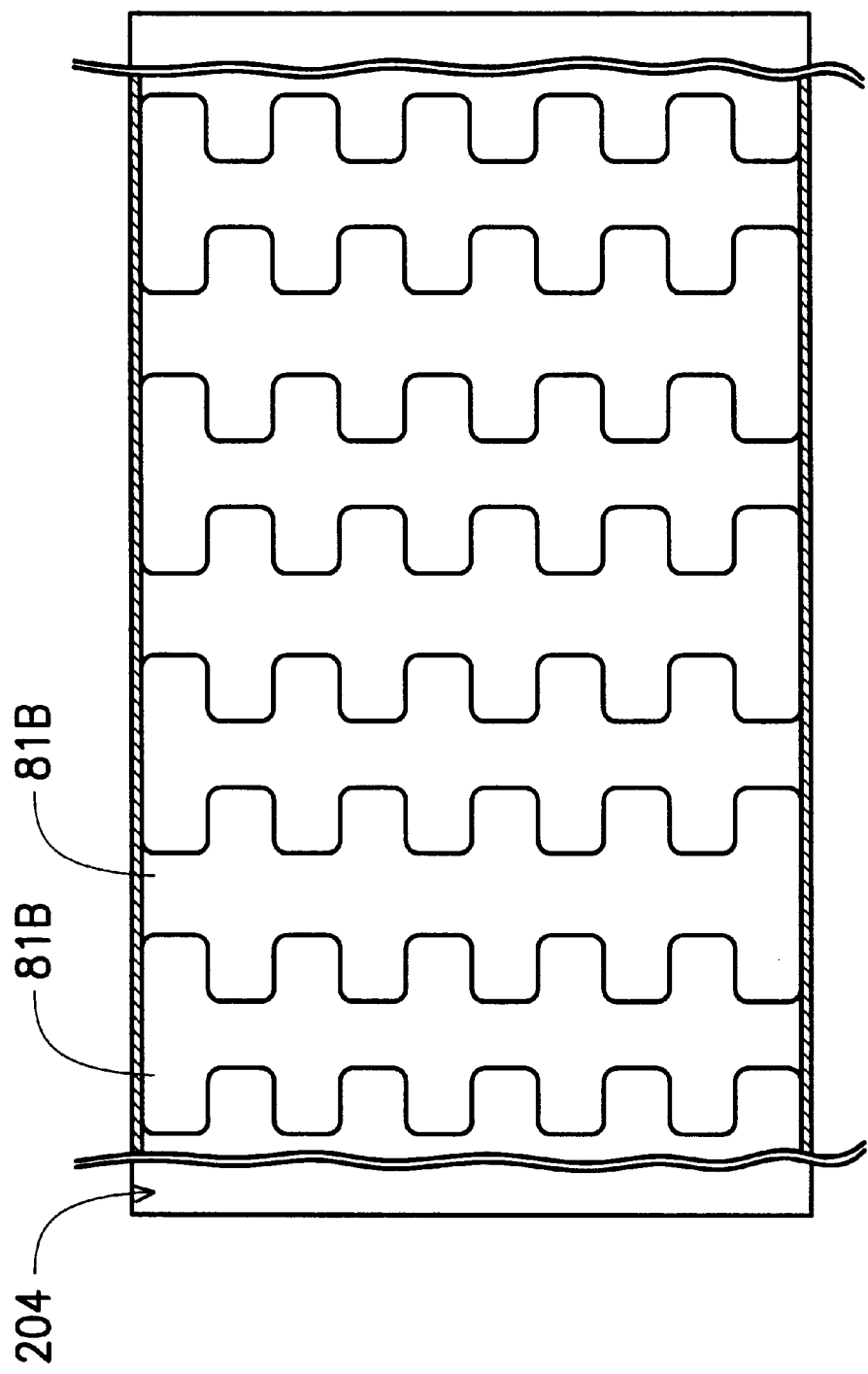
FIG. 5C represents the blanking of the central chamber of the air mattress shown in FIG. 5B by the interlocking method.

FIG. 5C represents the blanking of the main chamber 81 of the air-mattress 80 shown in FIG. 5B. The blanks 81B are pressed from the sheet bar 204.

Figure 5D:
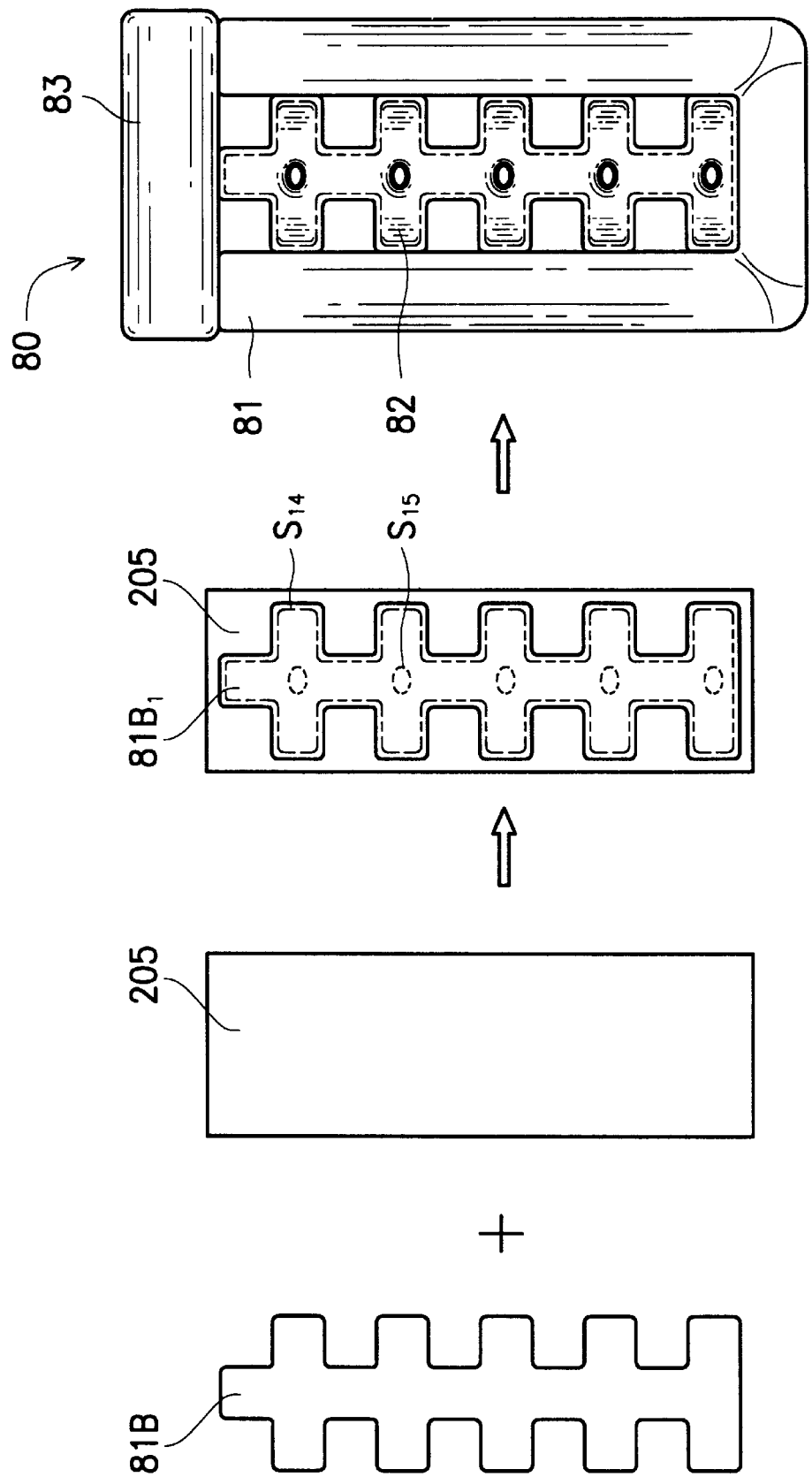
FIG. 5D is a flow chart showing the manufacturing process of the air mattress of FIG. 5B.

As shown in FIG. 5D, by attaching one blank 81B on the bottom lamina 205 and sealing along the dotted line $S_{14}$ and $S_{15}$, the main chamber 81 is completed. Therefore, the interlocking air-mattress 80 can be obtained by connecting the side chamber 82 and the pillow 83.

EXAMPLE 2

Figure 5E:
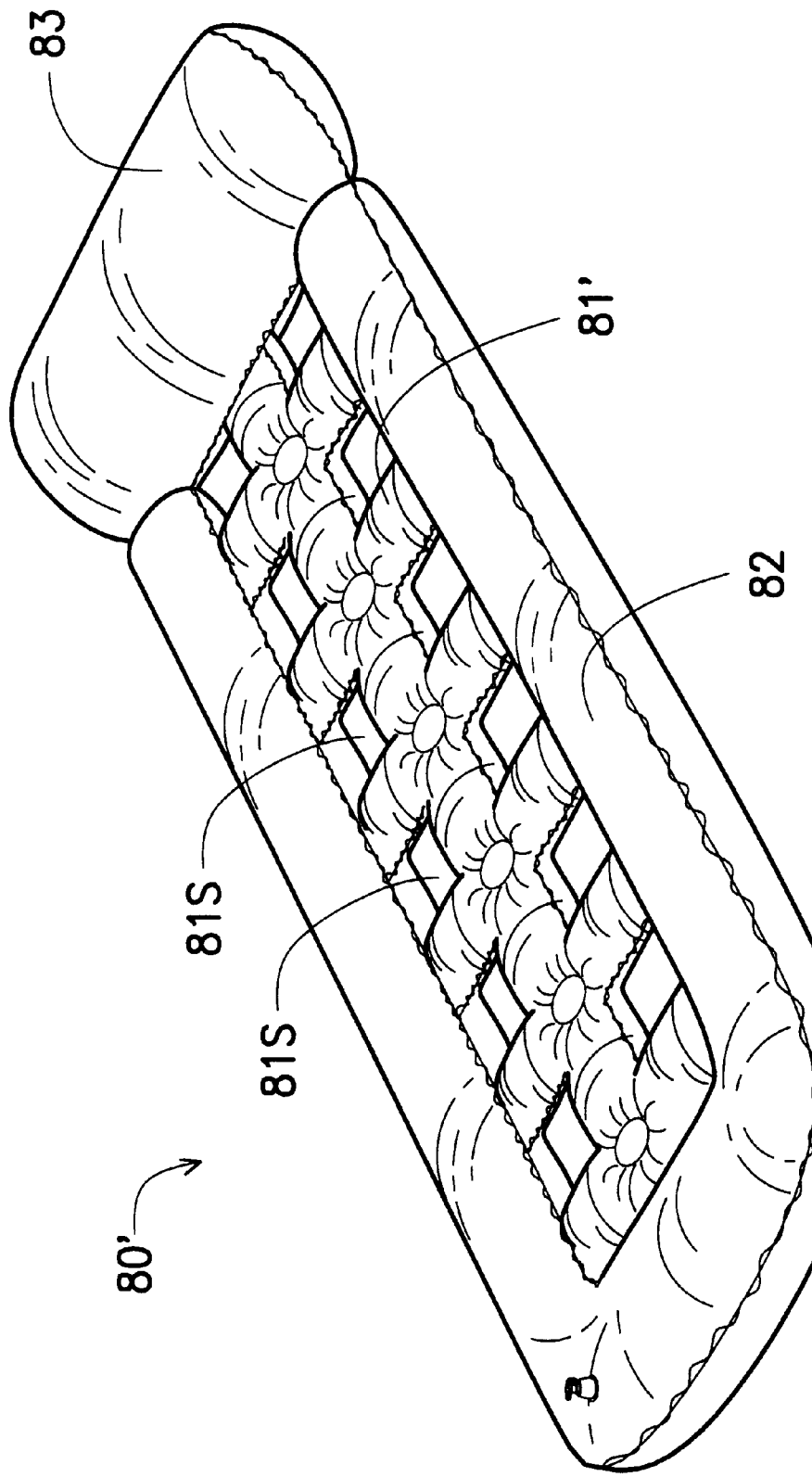
FIG. 5E is a perspective view showing the structure of another air mattress as Example 2 according to the fifth embodiment of the present invention.

FIG. 5E is a perspective view showing the structure of another interlocking air-mattress 80' as Example 2 according to the fifth embodiment of the present invention.

Figure 5F:
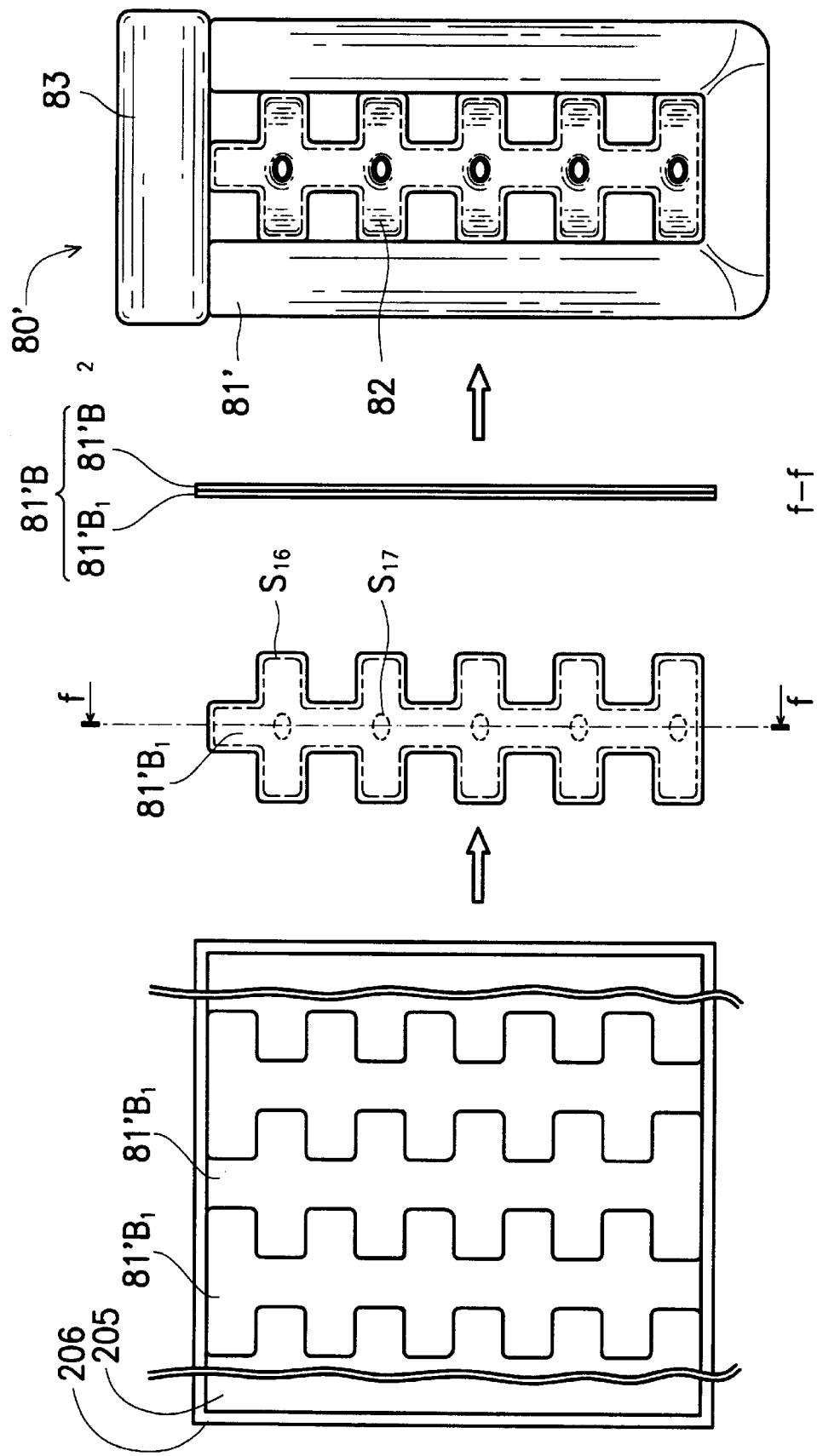
FIG. 5F represents the blanking of the central chamber of the air mattress shown in FIG. 5E by the interlocking method.

The structure of the air-mattress 80' is substantially the same as the structure of the air-mattress 80 according to the Example 2 shown in FIG. 5B with an essential difference being that there is provided a main chamber 81' with a plurality of through holes 81S which are formed between any two convexities of the blanks 81'B, wherein the blanks 81'B shown in FIG. 5F is the prototype of the main chamber 81 after blanking.

FIG. 5F represents the blanking of the main chamber 81'B of the air-mattress 80' shown in FIG. 5E by the interlocking method. The blanks 81'B ($81'B_1$ and $81'B_2$) is formed by pressing from the upper sheet bar 205 and the lower sheet bar 206 simultaneously. By sealing the blank $81'B_1$, $81'B_2$ together along the dotted lines $S_{16}$, $S_{17}$ and then connecting the side chamber 82 and the pillow 83, the interlocking air-mattress 80' can be obtained.

EXAMPLE 3

Figure 5G:
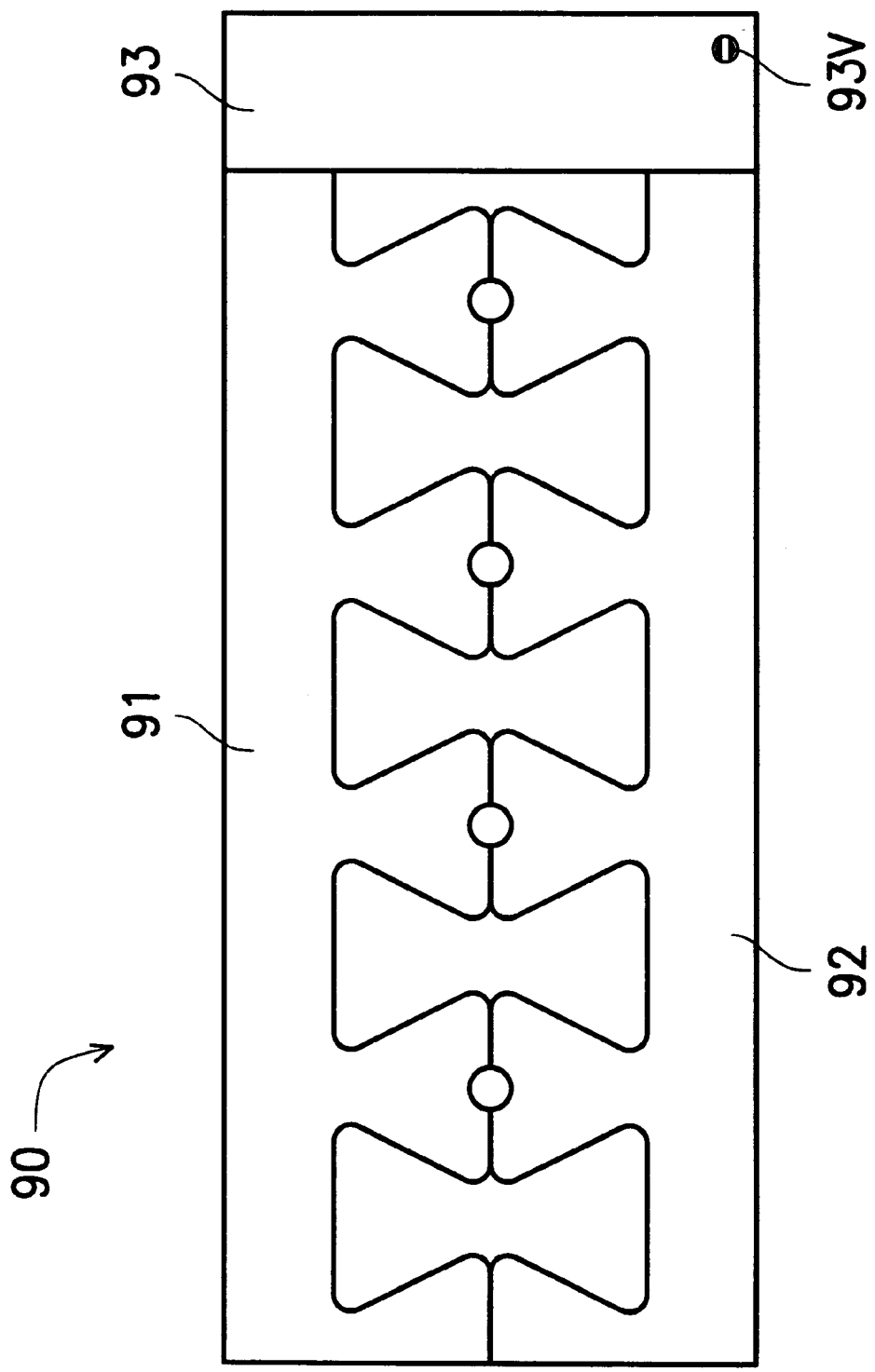
FIG. 5G is a plan view showing the structure of the other air mattress as Example 3 according to the fifth embodiment of the present invention.

FIG. 5G is a plan view showing the structure of the other interlocking air-mattress 90 as Example 3 according to the fifth embodiment of the present invention. The air-mattress 90 comprises a first chamber 91, a second chamber 92 and a pillow 93, wherein the pillow 93 is installed with a valve 93V for pumping the air.

Figure 5H:
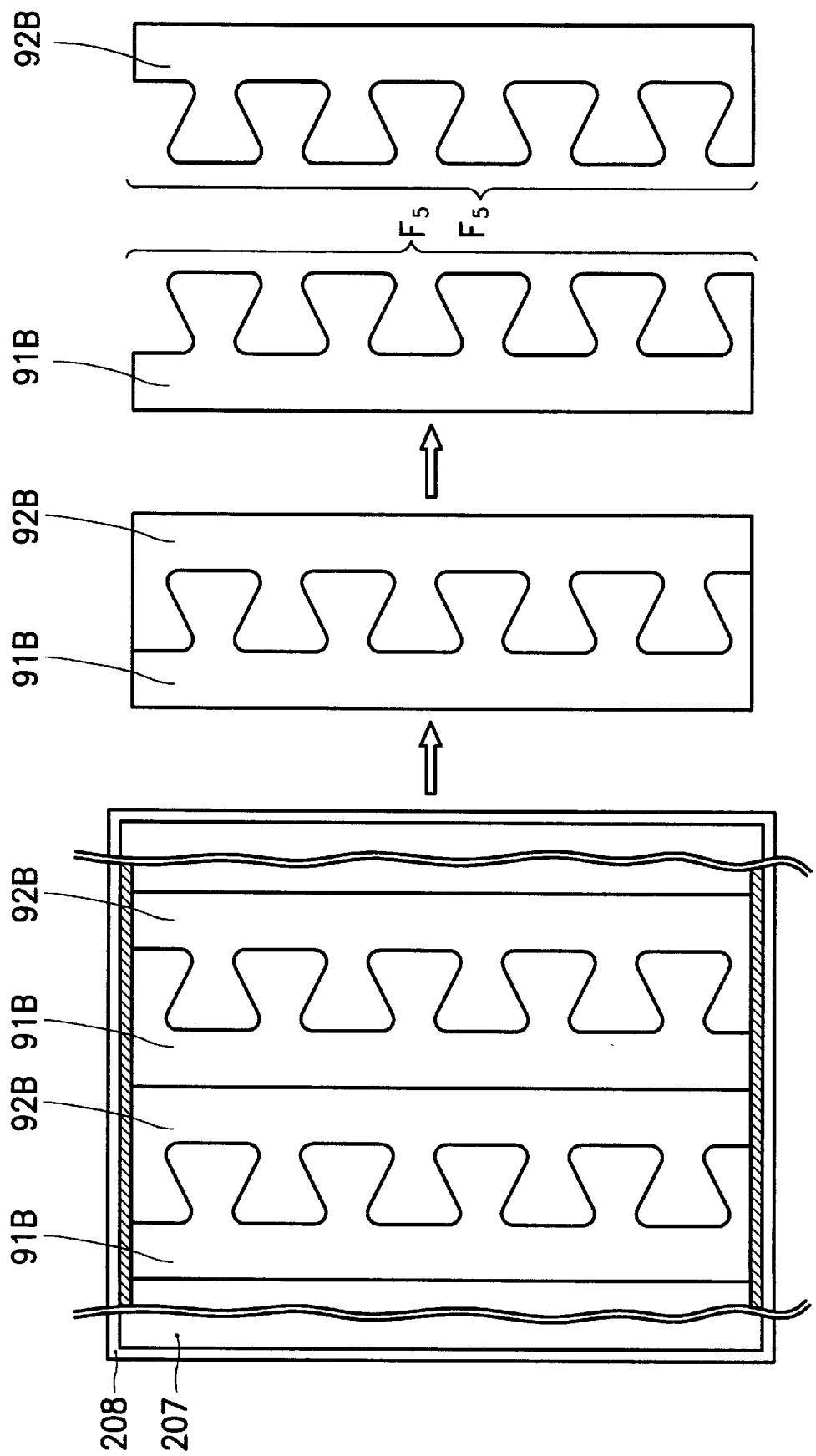
FIG. 5H represents the blanking of the first and second chamber of the air mattress shown in FIG. 5G.
Figure 51:
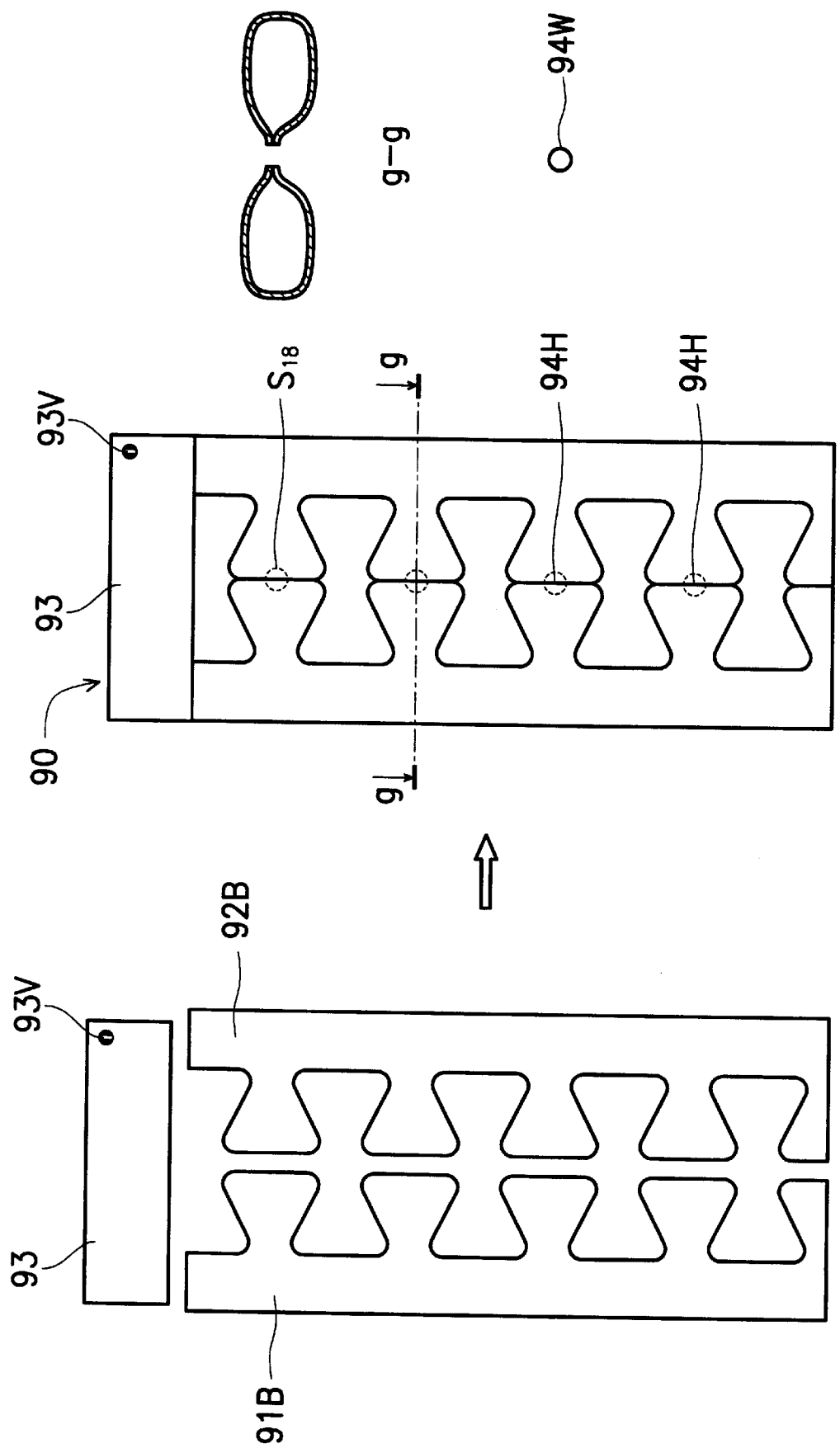

FIG. 5H represents the blanking of the first and second chamber 91, 92 of the air-mattress 90 shown in FIG. 5G. A pair of blanks 91B and 92B are pressed from the sheet bar 207 and 208 simultaneously, wherein each blank of the pair of blanks 91B, 92B has the same size and is formed with a concavo-convex side $F_5$.

Arranging the concavo-convex sides $F_5$, $F_5$ of two blanks 91B, 92B facing to each other, and connecting the pillow 93 to the ends of the blanks 91B and 92B simultaneously, as shown in FIG. 5I, the interlocking air-mattress 90 can be obtained by sealing along the interfaces therebetween. Meanwhile, the scraps 94W are taken off when the sealing process is applying on the circles $S_{18}$, and therefore a plurality of holes 94H are formed. The sectional structure of the air-mattress 90 is clearly represented in section g—g.

Based on the stability of this structure, a reinforcement 100 is applied on the air-mattress 90. The reinforcement 100 is formed with a plate 100P, wherein at the surface 100F of the plate 100P is equipped with a plurality of ball plugs 100B. The number of the ball plugs 100B are formed to match to the number of holes 94H on the blanks 91B and 92B.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. An interlocking method for manufacturing components of inflation products from sheet bar so as to reduce the amount of scrap material resulting from the manufacture of the component parts, the interlocking method comprising the steps of:

forming one piece of sheet bar into a plurality of sheet blanks, the plurality of blanks including at least one pair of complementary blanks, wherein each blank of the pair of complementary blanks is composed of an obverse blank and a reverse blank, the obverse blank and reverse blank each being formed with at least one concavo-convex side thereon that has a plurality of concavities and convexities, and the concavo-convex side of the obverse blank and the concavo-convex side of the reverse bank being complimentary to one another so that the two concavo-convex sides can be formed without wasting material; and connecting the blanks to one another so as to from a supporting structure of inflation products that has a plurality of openings formed therein.

2. An interlocking method for manufacturing components of inflation products from sheet bar so as to reduce the amount of scrap material resulting from the manufacture of the component parts, the interlocking method comprising the steps of:

forming one piece of sheet bar into a plurality of sheet blanks, the plurality of blanks including at least one pair of complementary blanks, wherein each blank of the pair of complementary blanks is composed of an obverse blank and a reverse blank, the obverse blank and reverse blank each being formed with at least one concavo-convex side thereon that has a plurality of concavities and convexities, and the concavo-convex side of the obverse blank and the concavo-convex side of the reverse bank being complimentary to one another so that the two concavo-convex sides can be formed without wasting material; and sealing at least one of said blanks to a joint member so as to form a closed space therebetween, wherein said closed space is adapted to be inflated.

3. The interlocking method for manufacturing components of claim 2, wherein the joint member is a sheet of material having dimensions that extend beyond the blank such that the structure formed when the blank is sealed to the joint member includes a portion having a double thickness of sheet material and a portion having a single thickness of sheet material, wherein the portion having a double thickness of sheet material is adapted to be inflated and the portion having a single thickness of sheet material is not adapted to be inflated.

4. The interlocking method for manufacturing components of claim 2, wherein said joint member is another one of the blanks.

5. An interlocking method for manufacturing components of inflation products according to claim 1, wherein said sheet bar is a flexible airtight sheet material.

6. An interlocking method for manufacturing components of inflation products according to claim 1, wherein a tension belt is formed by connecting a joint member to one of said blanks, and wherein said joint member may be another one of said complementary blanks.

7. An interlocking method for manufacturing components of inflation products according to claim 6, wherein the said joint member is sealed to said blank.

8. An interlocking method for manufacturing components of inflation products according to claim 6, wherein said tension belts can be formed into plate-type and annular-type interlocking tension belts.

9. An interlocking method for manufacturing components of inflation products according to claim 8, wherein the blank of each said annular-type interlocking tension belt has first and second layer, and both sides of said first and second layer are formed as said concavo-convex side, whereby the sealing method is used to connect said concavities at the ends of both sides of said first and second layer simultaneously.

10. An interlocking method for manufacturing components of inflation products according to claim 7, wherein each said plate-type interlocking tension belt may be formed by connecting said joint member to said concavo-convex side simultaneously, and the connection between said joint member and said concavo-convex side may use said sealing method, and the allocation of all said plate-type interlocking tension belts in said air bed may use a regular and/or alternative arrangement with at prescribed intervals.

11. An interlocking method for manufacturing components of inflation products according to claim 2, wherein said closed space can be inflated with air through a valve.

12. An interlocking method for manufacturing components of inflation products according to claim 2, wherein method is used to construct components of an air mattress that comprises a main chamber, a side chamber and a pillow, and said main chamber is composed of two said blanks which are laminated and connected each to other by sealing along said concavo-convex sides and therefore forming said closed space therein.

13. An interlocking method for manufacturing components of inflation products according to claim 2, wherein said method is used to construct components of an air mattress that includes a first chamber, a second chamber and a pillow, wherein said first chamber and said second chamber are separately composed of two said blanks which are laminated and connected to each other by sealing along said concavo-convex sides and therefore forming said closed space therein, and then said first chamber and said second chamber are jointed by individual connecting said concavities of said first chamber to said concavities of said second chamber together in parallel.

14. An interlocking method for manufacturing components of inflation products according to claim 13, wherein said air mattress can further constructed stably by applying a reinforcement thereon.

15. An interlocking method for manufacturing components of inflation products according to claim 2, wherein said method is used to construct components of a pool that comprises at least one chamber and a wall, and said wall is composed of a blank and a joint member wherein said blank and said joint member define two laminas which are joined together and form said closed space by sealing along said concavo-convex side of said blank thereof.

16. An interlocking method for manufacturing components of inflation products according to claim 15, wherein one blank of said blanks is said sheet bar being as one said lamina.

* * * * *